(12) United States Patent  (10) Patent No.: US 8,179,435 B2
Akatsuka et al.  (45) Date of Patent: May 15, 2012

(54) VEHICLE SURROUNDINGS IMAGE PROVIDING SYSTEM AND METHOD

(75) Inventors: Takeshi Akatsuka, Yokohama (JP); Ken Oizumi, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1629 days.

(21) Appl. No.: 11/520,638

(22) Filed: Sep. 14, 2006

(65) Prior Publication Data
US 2007/0072154 A1 Mar. 29, 2007

(30) Foreign Application Priority Data

Sep. 28, 2005 (JP) ................................. 2005-282073
Oct. 7, 2005 (JP) ................................. 2005-294635

(51) Int. Cl.
*H04N 7/18* (2006.01)
(52) U.S. Cl. ......................... 348/113; 348/115; 348/148
(58) Field of Classification Search ........... 348/100–160
See application file for complete search history.

(56) References Cited

U.S. PATENT DOCUMENTS 7,221,364 B2 * 5/2007 Matsumoto et al. .......... 345/419
7,643,911 B2 * 1/2010 Ishihara et al. ................... 701/1

FOREIGN PATENT DOCUMENTS

| JP | 5-139210 A | 6/1993 |
| JP | 7-184115 A | 7/1995 |
| JP | 7-304390 A | 11/1995 |
| JP | 10-299032 A | 11/1998 |
| JP | 2002-326540 A | 11/2002 |
| JP | 2004-034957 A | 2/2004 |
| JP | 2004-64131 A | 2/2004 |
| JP | 2005-184142 A | 7/2005 |
| JP | 2005-184225 A | 7/2005 |

* cited by examiner

*Primary Examiner* — Andy Rao
(74) *Attorney, Agent, or Firm* — Foley & Lardner LLP

(57) ABSTRACT

A system which provides a driver with an image obtained by photographing an area around a vehicle, the system comprising: a photographing unit which photographs an area around the vehicle which is out of the driver's line of sight because of a structure of the vehicle; an image processing unit which processes an image of the area around the vehicle photographed by the photographing unit; and a display unit which displays the image processed by the image processing unit, wherein the image processing unit performs coordinate transformation for the image photographed by the photographing unit based on information of a point-of-sight position of the driver and information of a setting state of the display unit to display an image the same as a view of the outside of the vehicle as is directly seen from the point-of-sight position of the driver through a setting area of the display unit.

18 Claims, 18 Drawing Sheets

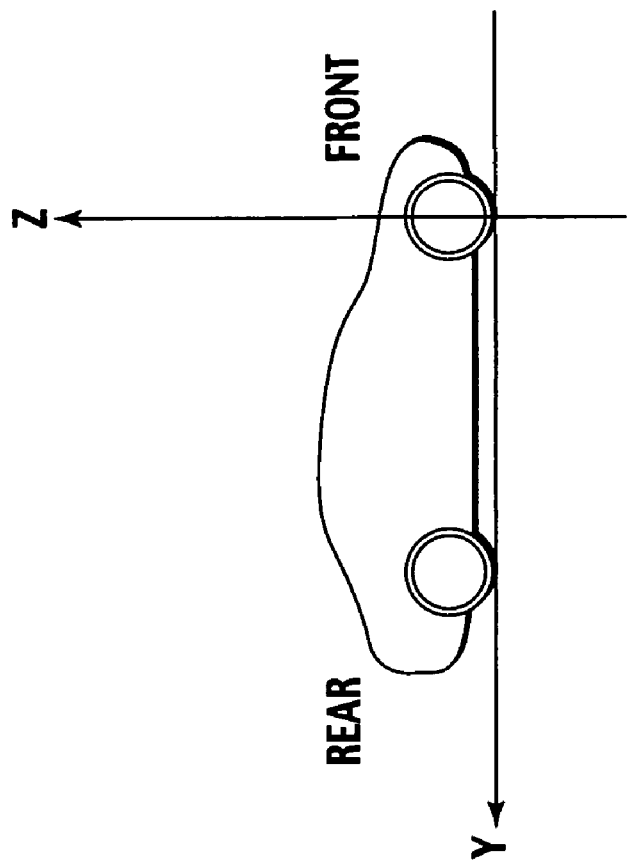
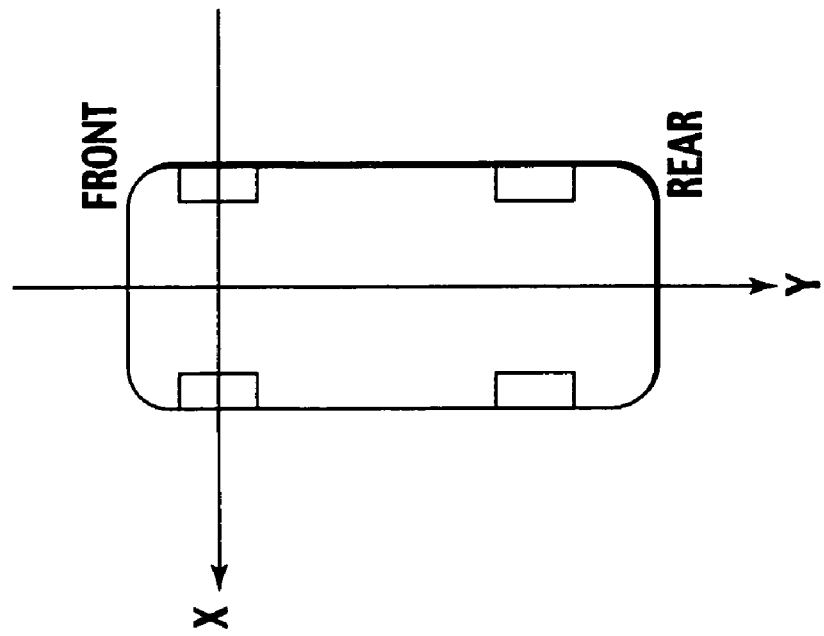

108

VEHICLE SURROUNDINGS IMAGE PROVIDING SYSTEM AND METHOD

BACKGROUND OF THE INVENTION

1. Field of the Invention

The present invention relates to a vehicle surroundings image providing system which provides, to a driver, an image obtained by photographing a periphery of a vehicle.

2. Description of the Related Art

A vehicle surroundings image providing system has been known, which displays, on a monitor, a periphery of a vehicle, which becomes a blind spot to a driver by a vehicle structural member (for example, a pillar). This system photographs the periphery of the vehicle by a camera installed outside of a vehicle cabin, and displays an image obtained by the photographing on the monitor provided at a position of the vehicle structural member (refer to Japanese Patent Laid-Open Publication No. 2004-34957).

SUMMARY OF THE INVENTION

However, since the above-described vehicle surroundings image providing system directly displays the image photograph by the camera on the monitor, the image displayed on the monitor and a scene on the periphery of the monitor, which is visible through windows, cannot look continuous with each other. Accordingly, the driver feels wrong.

The present invention was made to solve such a problem, and an object thereof is to provide a vehicle surroundings image providing system and method capable of reducing a driver's uncomfortable feeling when providing a driver with an image of a blind spot around the vehicle.

The first aspect of the present invention provides a vehicle surroundings image providing system which provides a driver with an image obtained by photographing an area around a vehicle, the system comprising: a photographing unit which photographs an area around the vehicle which is out of the driver's line of sight because of a structure of the vehicle; an image processing unit which processes an image of the area around the vehicle photographed by the photographing unit; and a display unit which displays the image processed by the image processing unit, wherein the image processing unit performs coordinate transformation for the image photographed by the photographing unit based on information of a point-of-sight position of the driver and information of a setting state of the display unit to display an image corresponding to a view of the outside of the vehicle as would be seen directly from the point-of-sight position of the driver, if the display unit were transparent.

The second aspect of the present invention provides a vehicle periphery image providing method to provide a driver with an image obtained by photographing an area around the vehicle by means of a display unit, the method comprising the steps of: photographing an area around the vehicle which is out of the driver's line of sight because of a structure of the vehicle; performing coordinate transformation for the photographed image based on information of a point-of-sight position of the driver and information of a setting state of the display unit to display on the display unit an image corresponding to a view of the outside of the vehicle as would be seen directly from the point-of-sight position of the driver, if the display unit were transparent; and displaying the coordinate-transformed image.

BRIEF DESCRIPTION OF THE DRAWINGS

The invention will now be described with reference to the accompanying drawings wherein:

FIGS. 10A and 10B are flowcharts showing a process of a point-of-sight position acquisition unit of FIG. 7;

DETAILED DESCRIPTION OF THE PREFERRED EMBODIMENTS

Hereinafter, a description is given of embodiments of the present invention with reference to the drawings.

Figure 1:
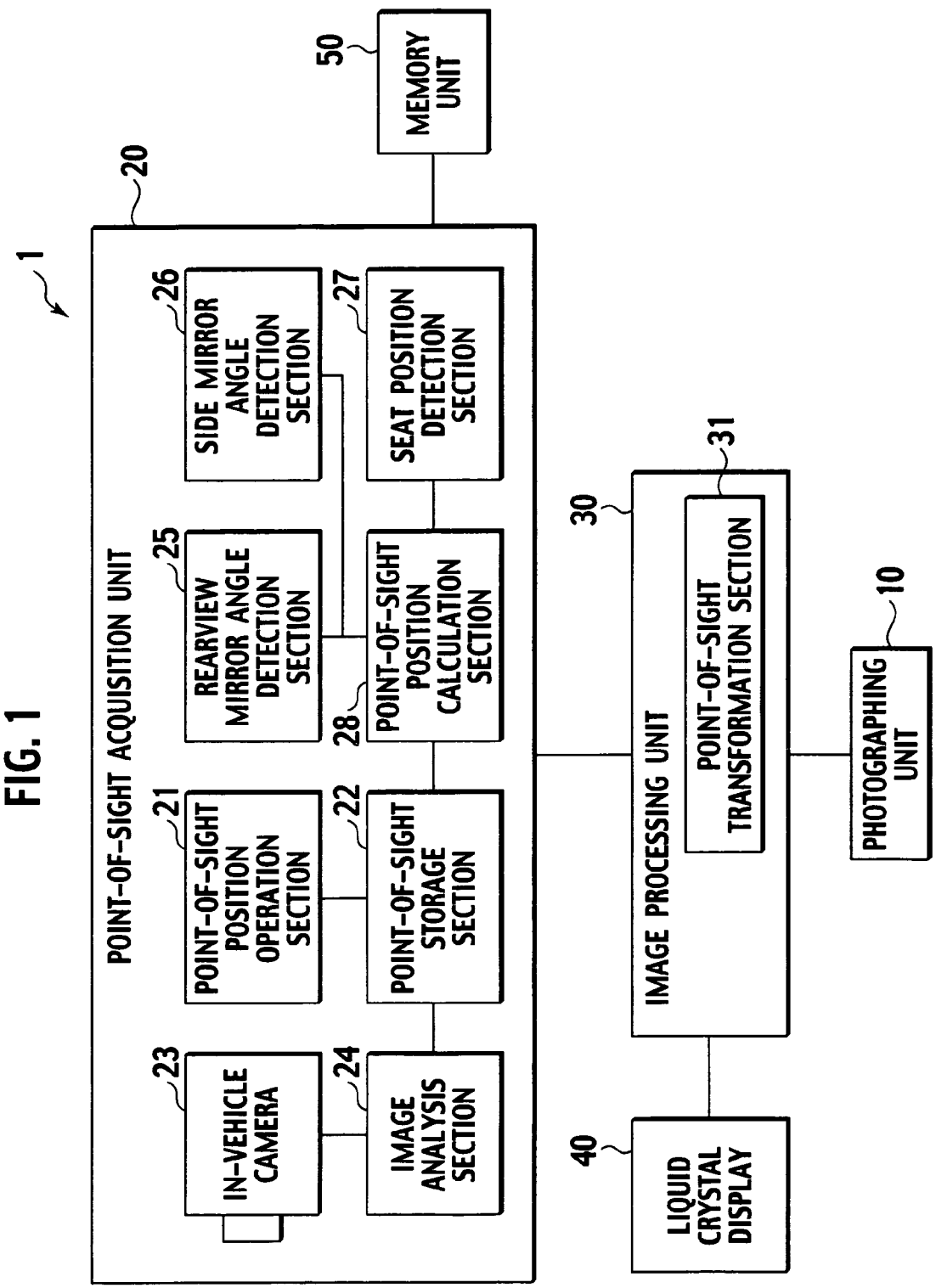
FIG. 1 is a block diagram showing a vehicle surroundings image providing system of a first embodiment of the present invention.

FIG. 1 is a block diagram showing a vehicle surroundings image providing system 1 of a first embodiment of the present invention. As shown in FIG. 1, the vehicle surroundings image providing system 1 of the first embodiment provides, to a driver, an image obtained by photographing a periphery of a vehicle. The vehicle surroundings image providing system 1 includes a photographing unit 10, a point-of-sight acquisition unit 20, an image processing unit 30, a liquid crystal display 40, and a memory unit 50.

The photographing unit 10 photographs the periphery of the vehicle, which becomes a blind spot to the driver by a structure of the vehicle. The photographing unit 10 is composed of a CCD (Charge-Coupled Device) camera or a CMOS (Complementary Metal Oxide Semiconductor) camera. The photographing unit 10 transmits an image signal obtained by the photographing to the image processing unit 30.

The point-of-sight position acquisition unit 20 acquires information of a point-of-sight position of the driver. The point-of-sight position acquisition unit 20 includes a point-of-sight position operation section 21 and a point-of-sight position storage section 22. The point-of-sight position operation section 21 is composed of switches which can be directly operated by the driver. Specifically, the point-of-sight position operation section 21 is composed of a viewing point moving up switch, a viewing point moving down switch, a viewing point moving forward switch, and a viewing point moving backward switch. The point-of-sight position storage section 22 stores a position set by an operation for the point-of-sight position operation section 21. The point-of-sight position acquisition unit 20 acquires the position stored by the viewing point storage section 22 as information of the point-of-sight position of the driver. The point-of-sight position acquisition unit 20 specifies the point-of-sight position according to the information inputted through the point-of-sight position operation section 21 in such a manner. The point-of-sight position acquisition unit 20 transmits the acquired point-of-sight position to the image processing unit 30.

The point-of-sight position acquisition unit 20 further includes an in-vehicle camera 23 and an image analysis section 24. The in-vehicle camera 23 photographs the driver's face. The image analysis section 24 identifies eye positions of the driver based on the image photographed by the in-vehicle camera 23. The point-of-sight position acquisition unit 20 acquires the driver's eye positions identified by the image analysis section 24 as the information of the driver's point-of-sight position. The point-of-sight position acquisition unit 20 transmits the acquired information of the driver's point-of-sight position to the image processing unit 30.

The point-of-sight position acquisition unit 20 further includes a rearview mirror angle detection section 25, a side mirror angle detection section 26, a seat position detection section 27, and a point-of-sight position calculation section 28. The rearview mirror angle detection section 25, side mirror angle detection section 26, and seat position detection section 27 are configured to detect setting states of vehicle devices (mirrors and a seat) used by the driver. The point-of-sight position calculation section 28 analyzes information of the setting states of the vehicle devices detected by the rearview mirror angle detection section 25, side mirror angle detection section 26, and seat position detection section 27 and specifies the point-of-sight position.

Specifically, the rearview mirror angle detection section 25 detects an angle (a direction of the mirror surface) of a rearview mirror of the vehicle. The side mirror angle detection section 26 detects angles (directions of the mirror surfaces) of right and left side mirrors of the vehicle. The seat position detection section 27 detects a position of a seat cushion and an angle of a seatback of the driver's seat.

Figure 2:
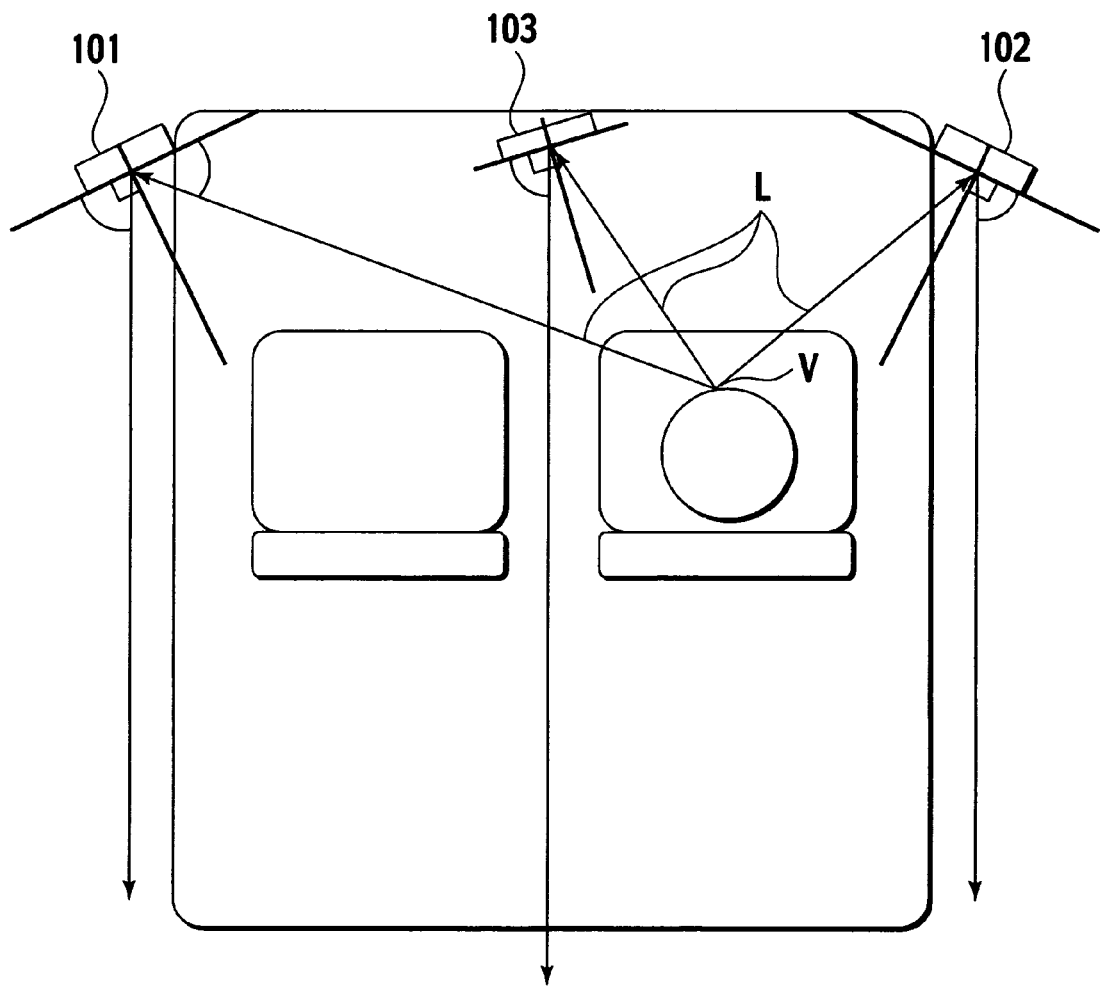
FIG. 2 is a first view showing a point-of-sight position acquisition method by a point-of-sight position acquisition unit of FIG. 1.

The point-of-sight position calculation section 28 calculates the driver's point-of-sight position based on results of detection by the rearview mirror angle detection section 25, side mirror angle detection section 26, and seat position detection section 27. FIG. 2 is a first view showing the point-of-sight position acquisition method by a point-of-sight position acquisition unit 20 of FIG. 1. As shown in FIG. 2, a description is given of a case where the information of the point-of-sight position is acquired based on right and left side mirrors 101 and 102 and a rearview mirror 103. In this case, the point-of-sight position calculation section 28 reads previously stored information on the setting positions of the mirrors 101 to 103. Subsequently, assuming that the setting angles of the mirrors 101 to 103 are adjusted so that the driver can see directly backward, the point-of-sight position calculation section 28 calculates straight lines L on which the driver's point-of-sight can exist based on lines extending directly backward from the setting positions of the mirrors 101 to 103 and the setting angles of the mirrors 101 to 103. The point-of-sight position calculation section 28 calculates a point-of-sight position V based on the intersection of these straight lines.

Herein, the point-of-sight position calculation section 28 can acquire information on the point-of-sight position based on one of the mirrors. In this case, the point-of-sight position calculation section 28 first calculates a straight line L on which the driver's point-of-sight position can exist based on one of the mirrors. Next, the point-of-sight position calculation section 28 calculates the point-of-sight position V based on this straight line L and a fixed seat position information previously stored.

Figure 3:
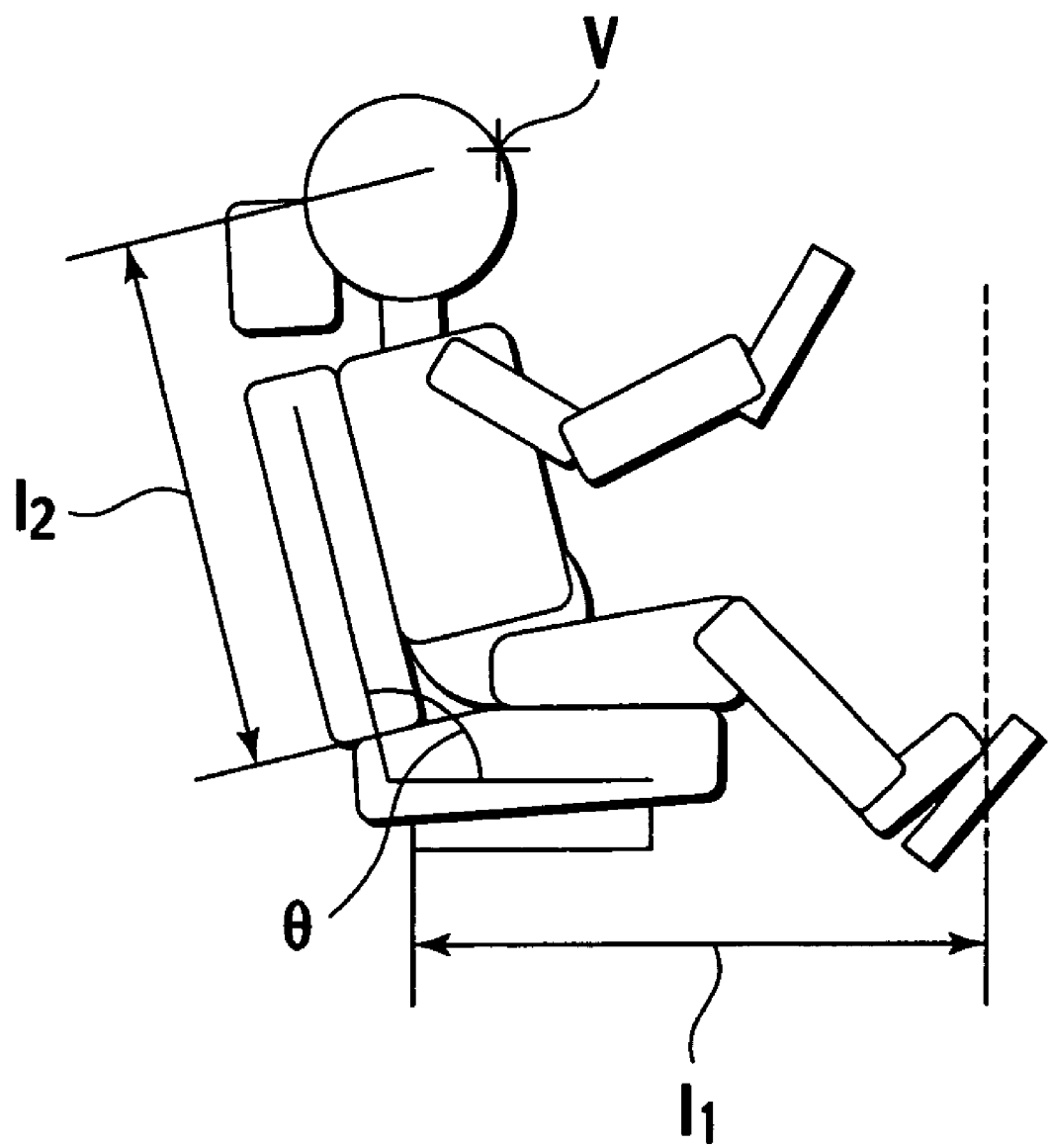
FIG. 3 is a second view showing the point-of-sight position acquisition method by the point-of-sight position acquisition unit of FIG. 1.

FIG. 3 is a second view showing the point-of-sight position acquisition method by the point-of-sight position acquisition unit 20 of FIG. 1. When the information of the point-of-sight position is acquired based on the seat state, the point-of-sight position calculation section 28 receives information of a longitudinal position 11 of the seat cushion from the seat position detection section 27. The point-of-sight position calculation section 28 receives information of an angle θ of the seatback. The view point position calculation section 28 then estimates a sitting height 12 of the driver from an average driver body and calculates the point-of-sight position V based on such information. The point-of-sight position acquisition unit 20 calculates the point-of-sight position V based on body information concerning the driver's body.

Desirably, the point-of-sight position calculation section 28 compositely calculates the point-of-sight position V based on two or more of the aforementioned seat state and the setting states of the side mirrors and rearview mirror.

The image processing unit 30 processes the image around the vehicle photographed by the photographing unit 10 based on the information of the point-of-sight position acquired by the point-of-sight position acquisition unit 20. The image processing unit 30 is composed of a microcomputer and a memory. Specifically, the image processing unit 30 is composed of an application specific integrated circuit (ASIC) and a field programmable gate array (FPGA), which incorporate operation programs and respective pieces of processing thereof. Moreover, the image processing unit 30 transmits the processed image to the liquid crystal display 40.

Figure 4:
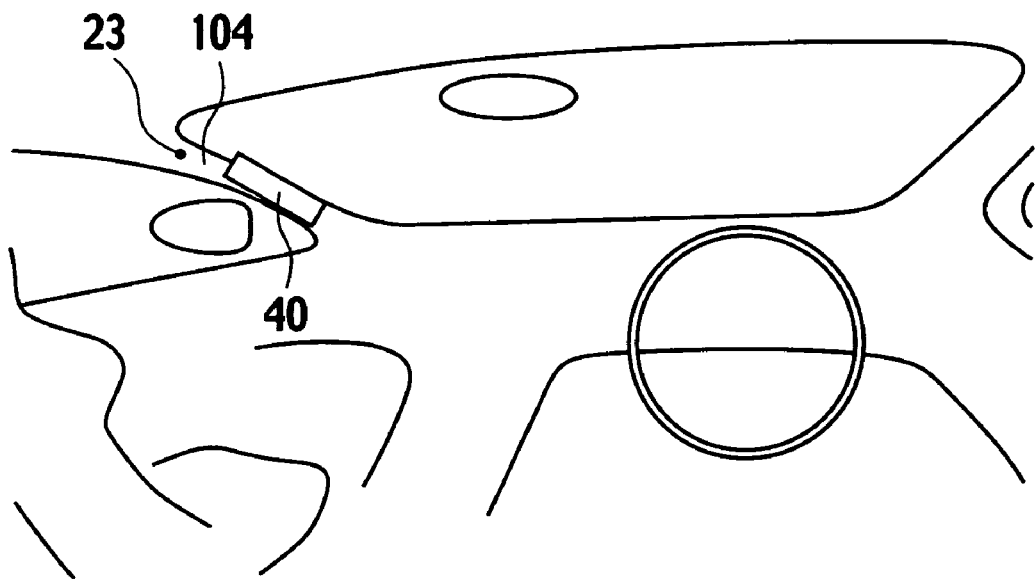
FIGS. 4 to 6 are views showing setting states of a liquid crystal display of FIG. 1.
Figure 5:
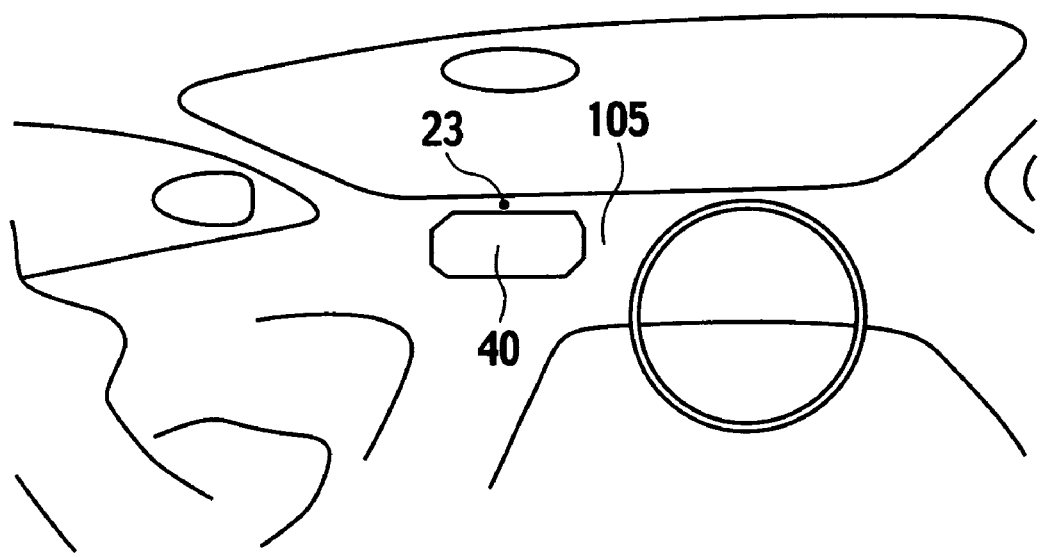
Figure 6:
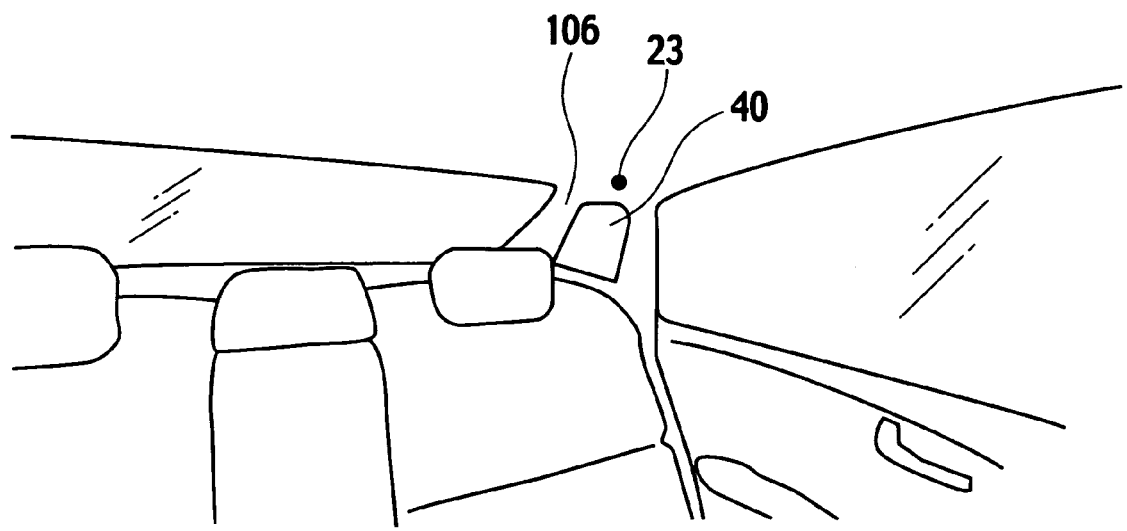

The liquid crystal display 40 displays the image processed by the image processing unit 30. FIGS. 4 to 6 are views showing setting states of a liquid crystal display 40 of FIG. 1. As shown in FIG. 4, the liquid crystal display 40 is placed on a pillar 104 (a so-called front pillar) which supports a roof of the vehicle at the vehicle front side. Moreover, the liquid crystal display 40 may be placed in an instrumental panel 105 between the driver's seat and a front passenger seat as shown in FIG. 5 or may be placed on a pillar (a so-called rear pillar) 106 at the vehicle rear side as shown in FIG. 6.

Herein, when the liquid crystal display 40 is provided for the front pillar 104, the in-vehicle camera 23 is provided substantially above the liquid crystal display 104 in the front pillar 104. When the liquid crystal display 40 is provided for the instrument panel 105, the in-vehicle camera 23 is provided substantially above the liquid crystal display 40 in the instrument panel 140. When the liquid crystal display 40 is provided for the rear pillar 106, the in-vehicle camera 23 is provided substantially above the liquid crystal display 40 in the instrument panel 106.

The liquid crystal display 40 is not limited to being provided for any one of the aforementioned three places, but the liquid crystal display 40, but it may be configured to provide liquid crystal displays for two or more of the aforementioned three places. Moreover, the in-vehicle camera 23 is not limited to being provided in the aforementioned places and only needs to be provided so as to photograph the driver's eyes when the driver sees the liquid crystal display 40.

Figure 7:
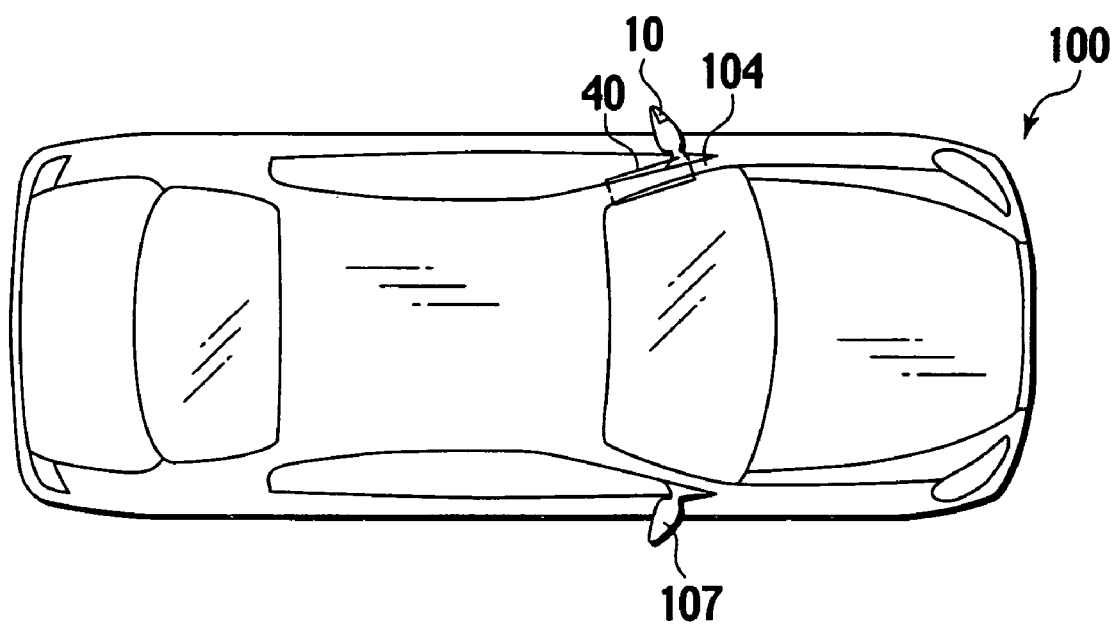
FIG. 7 is a view showing an example of setting of a photographing unit of FIG. 1.

FIG. 7 is a view showing an example of setting of the photographing unit 10 of FIG. 1. When the liquid crystal display 40 is attached to the front pillar 104, the photographing unit 10 is attached in the vicinity of the front pillar 104 as shown in FIG. 7. Specifically, the photographing unit 10 is attached to a door mirror 107 of a vehicle 100. The photographing unit 10 has an angle of view enough to photograph a blind spot created by the front pillar 104. When the horizontal width of the liquid crystal display 40 is larger than that of the front pillar 104, the photographing unit 10 has an angle of view enough to photograph a blind spot created by the liquid crystal display 40. The photographing unit 10 may be attached to the base of the front pillar 104, the roof, or an inner surface of a window as long as the photographing unit 10 can photograph a necessary range. In other words, the photographing unit 10 can be provided anywhere in the vehicle 100 as long as the photographing unit 10 can photograph the necessary range. Moreover, it may be configured to photograph the necessary range with a plurality of cameras.

The memory unit 50 stores body information of the driver. The body information is information concerning the driver's body and includes, for example, sitting height, height, leg length, and the like of the driver. The memory unit 50 stores the body information directly inputted by the driver in advance. The memory unit 50 may store the body information estimated from the seat state detected by the seat position detection section 27 instead of the body information directly inputted by the driver in advance. The viewing point position acquisition unit 20 may calculate the point-of-sight position V of the driver based on the body information stored in the memory unit 50.

The image processing unit 30 includes a point-of-sight transformation section 31. The point-of-sight transformation section 31 performs coordinate transformation for the image photographed by the photographing unit 10 based on the information of the driver's point-of-sight position and the information of the setting state (the setting position and setting area) of the liquid crystal display 40 so that the liquid crystal display 40 displays an image corresponding to a view of the outside of the vehicle as would be seen directly from the driver's point-of-sight, if the liquid crystal display 40 was transparent.

Figure 8:
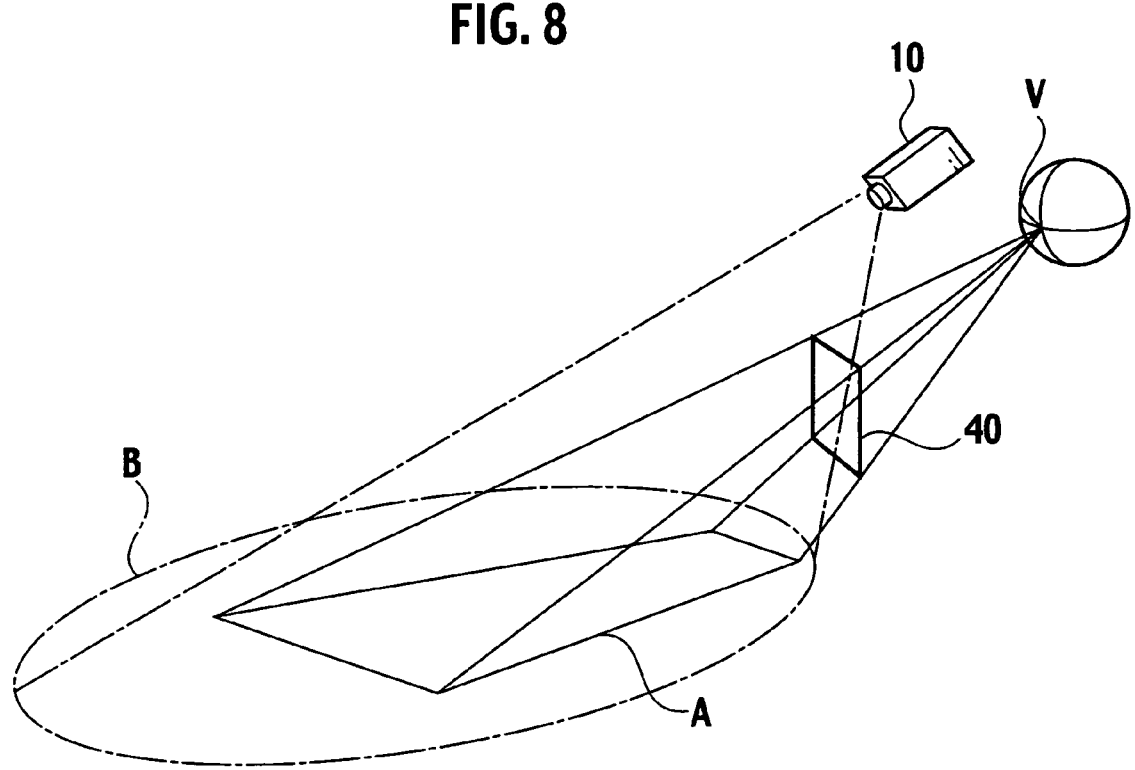
FIG. 8 is a view showing details of a point-of-sight transformation section of FIG. 1.

FIG. 8 is a view showing details of the point-of-sight transformation section 31 of FIG. 1. As shown in FIG. 8, if the installed area of the liquid crystal display 40 becomes transparent, then an area A is visible from a driver's point-of-sight position V of the driver. The photographing unit 10 photographs an area B including the area A. The point-of-sight transformation section 31 takes out an image of the area A obtained from information regarding a driver's point-of-sight position V and the installed state of the liquid crystal display 40 from the area B photograph by the photographing unit 10. Moreover, the point-of-sight transformation section 31 performs the coordinate conversion for the image of the area A, and creates an image of the outside of the vehicle, as would be seen by the driver if the liquid crystal display 40 was transparent.

Figure 9:
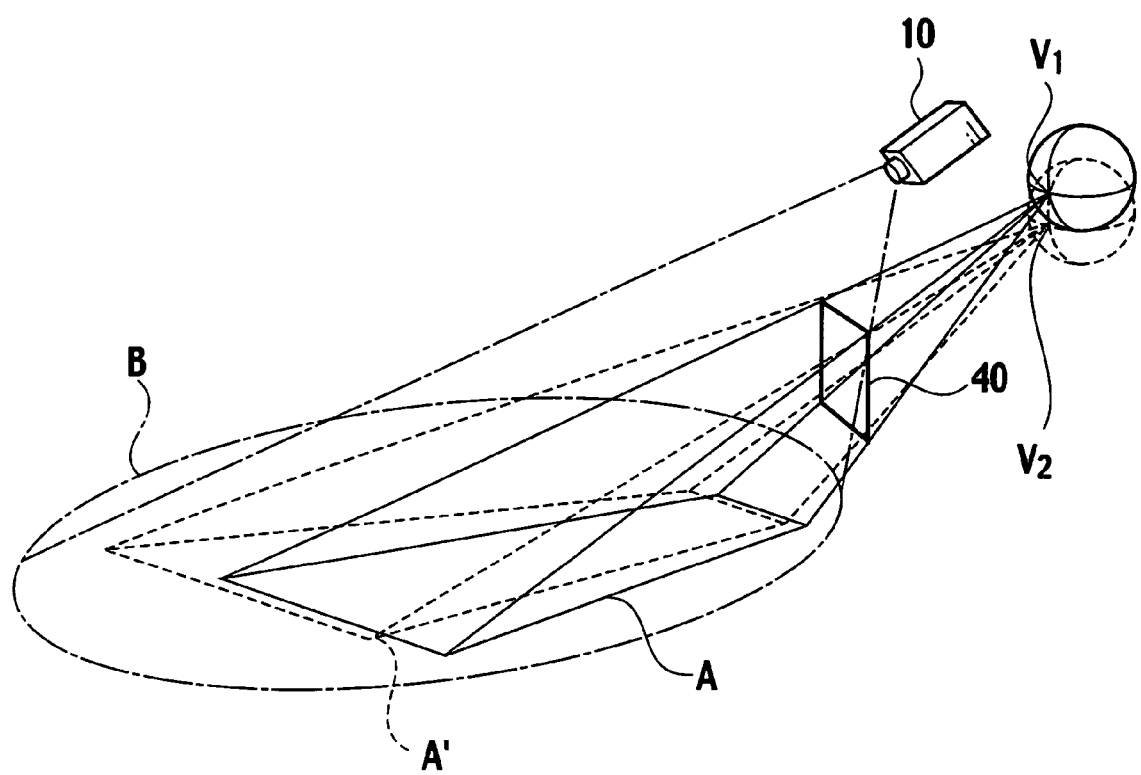
FIG. 9 is a second view showing details of the point-of-sight transformation section of FIG. 1.

FIG. 9 is a second view showing details of the point-of-sight transformation section 31 of FIG. 1. It is preferable that the point-of-sight transformation section 31 store information regarding a plurality of the driver's point-of-sight position V. In this case, the point-of-sight transformation section 31 obtains areas visible from the plurality of driver's point-of-sight positions V when the installed area of the liquid crystal display 40 becomes transparent. Then, the point-of-sight transformation section 31 displays, on the liquid crystal display 40, a large area including all of the obtained areas.

A description will be made of an example of the case where the point-of-sight transformation section 31 stores the information regarding two driver's point-of-sight positions V1 and V2 with reference to FIG. 9. In this case, the point-of-sight transformation section 31 obtains the area A visible from the driver's point-of-sight position V1. Moreover, the point-of-sight transformation section 31 obtains an area A' visible from the second driver's point-of-sight position V2. Then, the point-of-sight transformation section 31 obtains a large area A" including both of the areas A and A'. Subsequently, the point-of-sight transformation section 31 performs the coordinate conversion for the large area A" so that the large area A" can be displayed on the liquid crystal display 40.

Next, a description is given of an operation of the vehicle surroundings image providing system 1 of the embodiment. In the vehicle surroundings image providing system 1 of the embodiment, first, the photographing unit 10 photographs an image of an area around the vehicle including a blind spot. The photographing unit 10 then outputs data of the photographed image to the image processing unit 30 through a transmission line for video image signals of NTSC (National Television Standards Committee) or the like. Upon receiving the data of the photographed image from the photographing unit 10, the image processing unit 30 divides the received data into data for each pixel and stores the same in an internal input frame buffer.

Next, the image processing unit 30 copies the data of the pixels in the input frame buffer into an output frame buffer according to contents of the transformation process. The contents of the transformation process include information on where in the output frame buffer the data of each pixel is copied. In other words, the contents of the transformation process include information on corresponding relations between the pixels of the input frame buffer and the pixels of the output frame buffer. The image processing unit 30 copies the data of the pixels of the input frame buffer to the output frame buffer based on the corresponding relation of each pixel to complete an output image to be displayed on the liquid crystal display 40.

Next, the image processing unit 30 outputs the contents of the output frame buffer, that is, data of the output image to the liquid crystal display 40 using the transmission line for the video image signals of NTSC or the like. The liquid crystal display 40 then performs display processing based on the data of the output image transmitted from the image processing unit 30, thus displaying an image of the blind spot created by the front pillar 104 on the liquid crystal display 40. The vehicle surroundings image providing system 1 of the embodiment repeats a series of the aforementioned processes for each frame of the image photographed by the photographing unit 10 to display the image of the blind spot on the liquid crystal display 40 as a moving image. Note that the part of the aforementioned series of processes other than the transformation process by the image processing unit 30 which is characteristic of the vehicle surroundings image providing system 1 of the embodiment is performed by means of a technology known in the field of image processing using a computer.

Herein, the contents of the transformation process by the image processing unit 30 which is characteristic of the vehicle surroundings image providing system 1 of the embodiment are described in detail using a concrete example. In the vehicle surroundings image providing system 1 of the embodiment, as described above, the point-of-sight transformation section 31 of the image processing unit 30 performs coordinate transformation for the image photographed by the photographing unit 10 based on information of space coordinates of the driver's point-of-sight position V and the information of the setting state of the liquid crystal display 40 (space coordinates of each pixel constituting a display screen). In the first embodiment, the driver's point-of-sight position V is specified in the form of a point at this time. The following description is given of details of the coordinate transformation using a three-dimensional coordinate system with an axis X being set to the lateral direction of the vehicle, an axis Y being set to the longitudinal direction of the vehicle, and an axis Z being set to the height direction of the vehicle. In this coordinate system, the X-Y plane is the ground.

Figure 11:
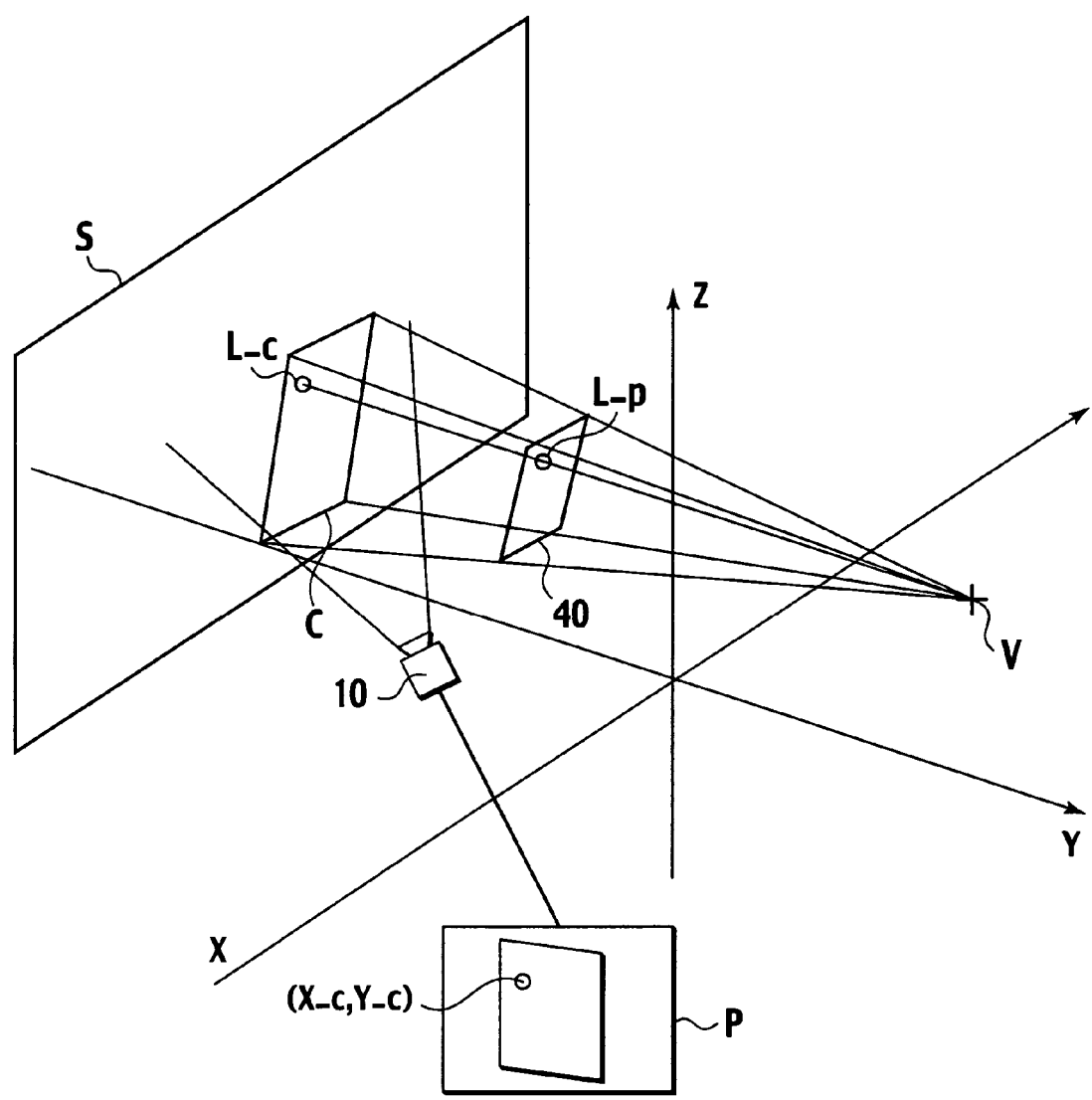
FIG. 11 is a view showing details of a transformation process by an image processing unit of FIG. 1.

The description is given with reference to FIG. 11. FIG. 11 is a view showing details of a transformation process by an image processing unit 30 of FIG. 1. First, the point-of-sight position acquisition unit 20 calculates space coordinates (x, y, z) of the driver's point-of-sight position V. Next, the point-of-sight transformation section 31 sets a reference plane at a predetermined position in the area around the vehicle including the blind spot. Desirably, a reference plane S is set vertical (Y=−k1) to the X-Y plane (ground) as shown in FIG. 11. Moreover, reference planes may be set so as to surround the front and back, right and left sides, and top and bottom of the vehicle (Z=0, Y=k1, X=k2, Y=−k1, X=−k2, Z=k3, where k, k2, and k3 are proper positive constants).

Subsequently, the point-of-sight transformation section 31 calculates space coordinates L_p (x, y, z) of a specific pixel L_p constituting the display screen of the liquid crystal display 40 and then calculates a half line extending from the point-of-sight position V through the specific pixel L_p. The point-of-sight transformation section 31 calculates an intersection L_c of the half line and the reference plane S. The half line is uniquely determined from the space coordinates (x, y, z) of the driver's point-of-sight position V and the space coordinates (x, y, z) of the specific pixel L_p constituting the display screen of the liquid crystal display 40.

When six reference planes are set, a plurality of intersections L_c corresponding to the specific pixel of the liquid crystal display 40 are calculated in some cases. In such a case, the intersection L_c closed to the driver's point-of-sight position V is selected.

Next, the point-of-sight transformation section 31 sets data of the specific pixel L_p using data of the intersection L_c. The point-of-sight transformation section 31 performs a series of these processes (from the process following the process of setting the reference plane S to the process of setting the data of the specific pixel L_p using the data of the pixel of the intersection L_c) for all the pixels constituting the display screen of the liquid crystal display 40. The point-of-sight transformation section 31 thus creates an image to be displayed on the liquid crystal display 40.

More details are described. The point-of-sight position transformation section 31 specifies a pixel (X_c, Y_c) in a photographed image P corresponding to the intersection L_c on the reference plane S using various types of parameters including the direction and orientation of the photographing unit 10 attached and lens aberration. The point-of-sight transformation section 31 sets the data of this pixel (X_c, Y_c) as the data of the specific pixel L_p. Specifically, the point-of-sight transformation section 31 stores the data of the pixel (X_c, Y_c) into the input frame buffer and copies the same to the specific pixel L_p of the output frame buffer.

As described above, the data of each pixel of the input frame buffer is copied to the output frame buffer to create an image, and the image is displayed on the liquid crystal display 40. The image displayed on the liquid crystal display 40 has a range equal to the range which is shielded by the liquid crystal display 40 when viewed from the point of sight of the driver of the vehicle. Accordingly, the image displayed on the liquid crystal display 40 is continuous with an actual view seen through the front or side window. The driver of the vehicle can recognize the image without feeling uncomfortable. When the liquid crystal display 40 is attached to the vehicle inner side of the front pillar 104, the driver of the vehicle can recognize the condition of a blind spot created by the front pillar 104 by referring to the image displayed on the liquid crystal display 40.

The above-described contents of the transformation process may be performed in real time when each image is created. However, the contents of the transformation process do not change if the positional relation between the driver's point-of-sight position V and each pixel L_p constituting the display screen of the liquid crystal display 40 does not change. The image processing unit 30 therefore stores the results once calculated into a memory of the point-of-sight transformation section as a transformation table. In the subsequent transformation processes, the point-of-sight transformation section 31 may be configured to transform the image photographed by the photographing unit 10 based on the transformation table to create the output image.

Moreover, when the point-of-sight position acquisition unit 20 detects a change in the driver's point-of-sight position V, the point-of-sight transfolination section 31 may newly perform the transformation and update the transformation table. Moreover, the point-of-sight transformation section 31 may previously create transformation tables corresponding to a plurality of point-of-sight positions V and properly use these transformation tables according to the results of measurement by the point-of-sight position acquisition unit 20.

The aforementioned processes can be performed in both cases of using the liquid crystal display 40 whose display screen is planar and using a monitor whose display screen is curved. In the case of using a projector instead of the liquid crystal display 40, the aforementioned processes can be performed by using space coordinates of pixels on a projection plane.

Figure 12:
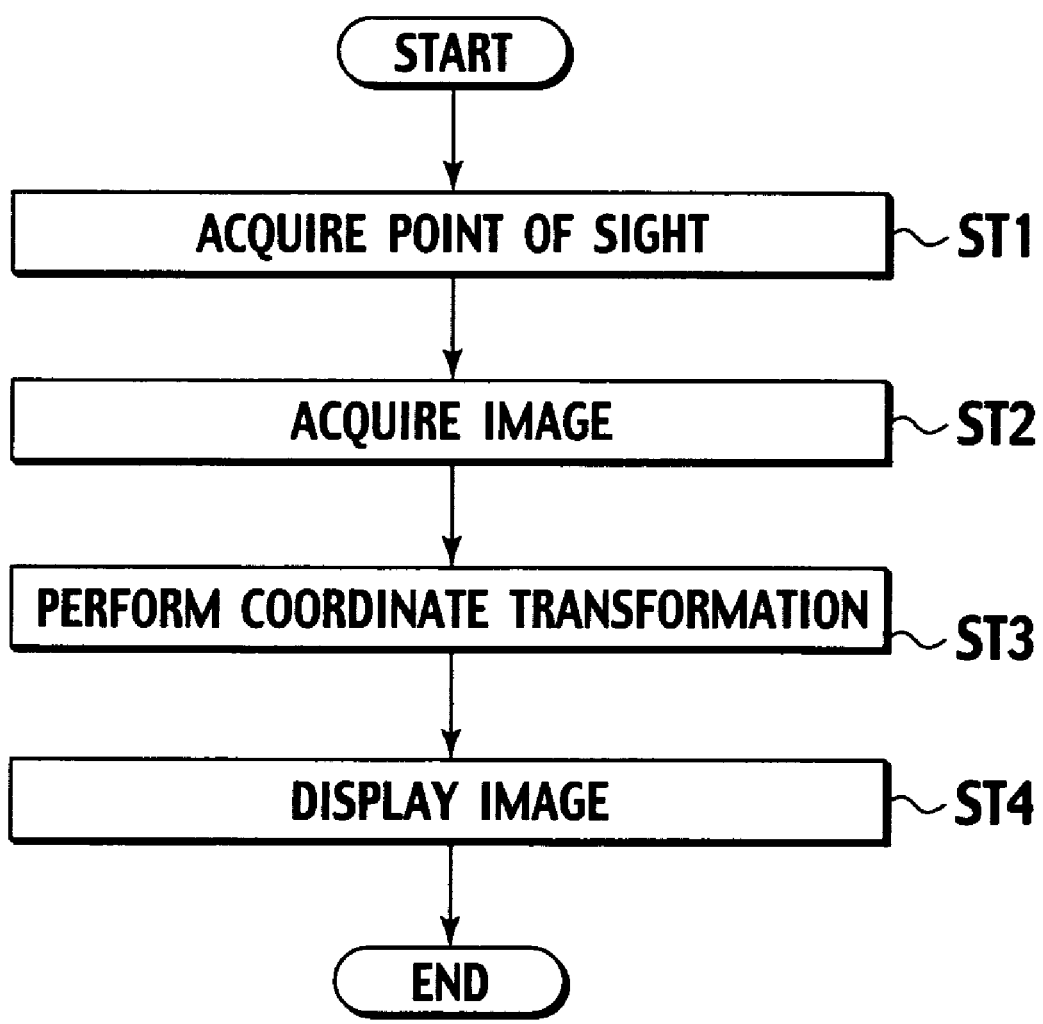
FIG. 12 is a flowchart showing an example of a detailed operation of the vehicle surroundings image providing system according to the first embodiment.

Next, a description is given of an example of a detailed operation of the vehicle surroundings image providing system 1 according to the embodiment. FIG. 12 is a flowchart showing an example of a detailed operation of the vehicle surroundings image providing system 1 according to the first embodiment. As shown in FIG. 12, first, the point-of-sight position acquisition unit 20 acquires information of the driver's point-of-sight position (ST1). Next, the photographing unit 10 acquires an image of an area around the vehicle which is out of the driver's line of sight (ST2).

Subsequently, the point-of-sight transformation section 31 performs the coordinate transformation process as described with reference to FIG. 11 (ST3). The liquid crystal display 40 displays the image processed in the step ST3 (ST4). Thereafter, the aforementioned processes are repeated until the system 1 is powered off.

Figure 13:
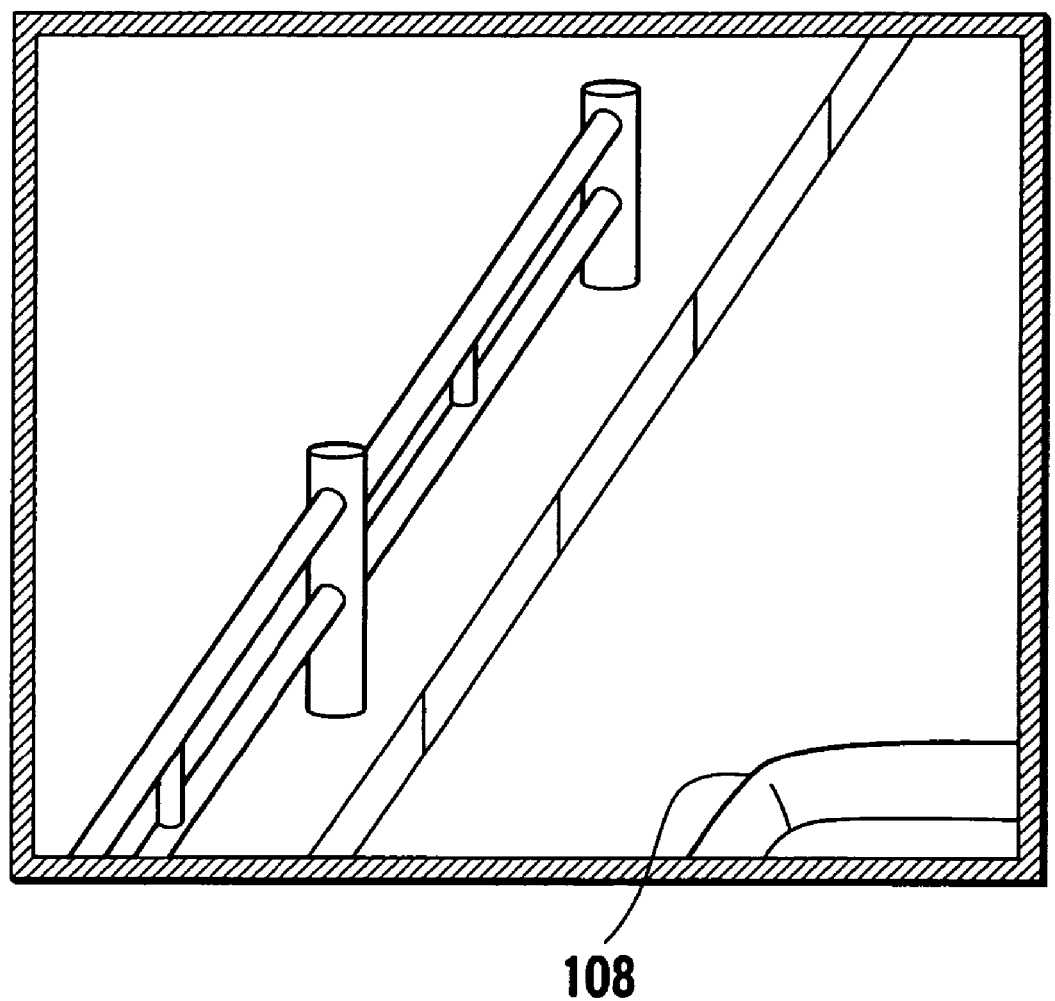
FIG. 13 is a view showing an example of a display when the liquid crystal display is provided for an instrument panel.

Herein, when the liquid crystal display 40 is provided for an instrument panel, the image processing unit 30 displays peripheral part of the vehicle body in addition to the surroundings of the vehicle. FIG. 13 is a view showing an example of a display when the liquid crystal display 40 is provided for an instrument panel 105. When the liquid crystal display 40 is provided for the instrument panel 105, an image of the front left corner of the vehicle is displayed on the liquid crystal display 40. In order not to scrape the front left corner with an obstacle such as a wall, a vehicle body outline 108 is displayed for drive assist.

Figure 14:
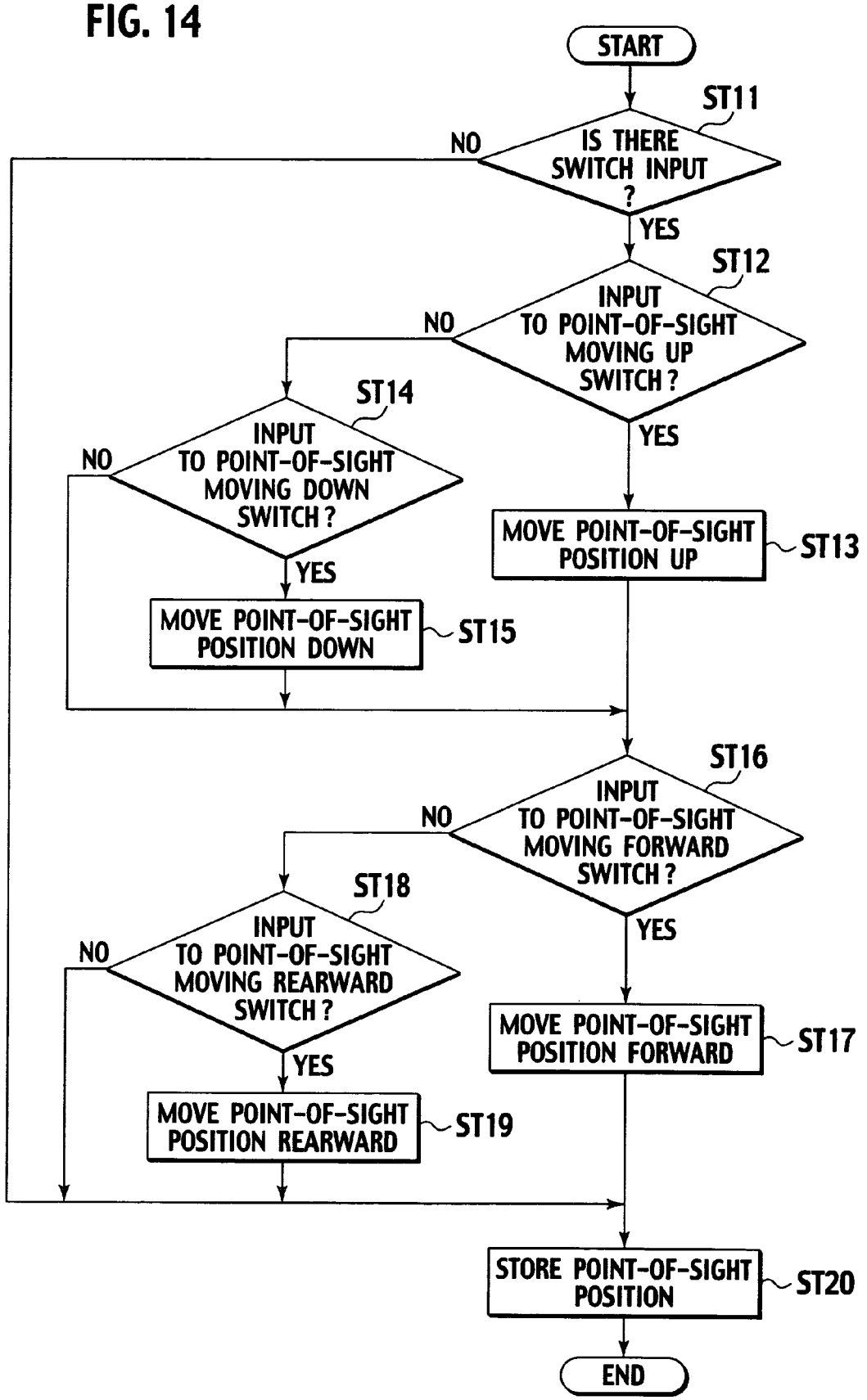
FIG. 14 is a flowchart showing an example of a process of the point-of-sight position acquisition unit shown in FIG. 1.

FIG. 14 is a flowchart showing an example of a process of the point-of-sight position acquisition unit 20 shown in FIG. 1, which is an example of the case of direct input through the point-of-sight position operation section 21. As shown in FIG. 14, first, the point-of-sight position acquisition unit 20 determines whether or not a switching input has been made to the point-of-sight position operation section 21 (ST11). When the point-of-sight position acquisition unit 20 has determined that no switching input has been made (ST11: NO), the processing proceeds to Step ST20.

Meanwhile, when the point-of-sight position acquisition unit 20 has determined that the switching input has been made (ST11: YES), the point-of-sight position acquisition unit 20 determines whether or not an input to the point-of-sight elevating switch has been made (ST12). When the point-of-sight position acquisition unit 20 has determined that the input to the point-of-sight elevating switch has been made (ST12: YES), the point-of-sight position acquisition unit 20 elevates height of the point-of-sight position V to be stored (ST13). Then, the processing proceeds to Step ST16.

Moreover, when the point-of-sight position acquisition unit 20 has determined that no input to the point-of-sight elevating switch has been made (ST12: NO), the point-of-sight position acquisition unit 20 determines whether or not an input to the point-of-sight lowering switch has been made (ST14). When the point-of-sight position acquisition unit 20 has determined that no input to the point-of-sight lowering switch has been made (ST14: NO), the processing proceeds to Step ST16. Meanwhile, when the point-of-sight position acquisition unit 20 has determined that the input to the point-of-sight lowering switch has been made (ST14: YES), the point-of-sight position acquisition unit 20 lowers the height of the point-of-sight position V to be stored (ST15), and the processing proceeds to Step ST16.

In Step ST16, the point-of-sight position acquisition unit 20 determines whether or not an input to the point-of-sight advancing switch has been made (ST16). When the point-of-sight position acquisition unit 20 has determined that the input to the point-of-sight advancing switch has been made (ST16: YES), the point-of-sight position acquisition unit 20 advances the point-of-sight position V to be stored (ST17). Then, the processing proceeds to Step ST20.

Moreover, when the point-of-sight position acquisition unit 20 has determined that no input to the point-of-sight advancing switch has been made (ST16: NO), the point-of-sight position acquisition unit 20 determines whether or not an input to the point-of-sight retreating switch has been made (ST18). When the point-of-sight position acquisition unit 20 has determined that no input to the point-of-sight retreating switch has been made (ST18: NO), the processing proceeds to Step ST20. Meanwhile, when the point-of-sight position acquisition unit 20 has determined that the input to the point-of-sight retreating switch has been made (ST18: YES), the point-of-sight position acquisition unit 20 retreats the point-of-sight position V to be stored (ST19), and the processing proceeds to Step ST20.

Then, in Step ST20, the point-of-sight position storage section 22 stores the point-of-sight position V that has been moved (ST20). Thereafter, the above-described processing is repeated until a power supply of vehicle surroundings image providing system 1 is turned off.

As described above, in the vehicle surroundings image providing system 1 and method of the embodiment, the point-of-sight transformation section 31 performs coordinate transformation for the image photographed by the photographing unit 10 based on the information of the point-of-sight position V and the information of the setting state of the liquid crystal display 40 so that the liquid crystal display 40 displays an image the same as a view of the outside of the vehicle as would be seen directly from the point-of-sight position V through the setting area of the liquid crystal display 40. The liquid crystal display 40 displays an image as if the outside of the vehicle could be directly seen through the liquid crystal display 40. Accordingly, the image displayed on the liquid crystal display 40 and the view seen through a window or and the like around the liquid crystal display 40 can be therefore recognized continuously. It is therefore possible to reduce the driver's uncomfortable feeling when the image of the area around the vehicle which is out of the driver's line of sight is provided for the driver.

The point-of-sight transformation section 31 performs coordinate transformation for the image photographed by the photographing unit 10 based on the information of the point-of-sight position V acquired by the point-of-sight position acquisition unit 20 and the information of the setting state of the liquid crystal display 40. The coordinate transformation is carried out in consideration of the driver's point-of-sight position V as described above. Accordingly, even if the driver's point-of-sight position V changes, the image on the liquid crystal display 40 is adjusted so as to be displayed as if the outside of the vehicle was directly seen through the liquid crystal display 40.

Moreover, the point-of-sight position acquisition unit 20 includes the point-of-sight position operation section 21 through which the driver can directly input. The point-of-sight position acquisition unit 20 specifies the point-of-sight position V according to the information inputted through the operation section 21. The point-of-sight position V is thus determined by the operation of the driver, so that the point-of-sight position V can be accurately set.

Moreover, the point-of-sight position acquisition unit 20 analyzes the information of the setting states of the vehicle devices (the mirrors and seat) used by the driver to specify the point-of-sight position V. Accordingly, the point-of-sight position V can be specified without the need for input by the driver.

Moreover, the point-of-sight position acquisition unit 20 specifies the driver's point-of-sight position V based on the information of the setting state of at least one vehicle device out of the rearview mirror angle detection section 25, side mirror angle detection section 26, and seat position detection section 27. Herein, the driver adjusts the mirrors 101 to 103 or seat to easily drive. Even if the driver is changed to another person, the point-of-sight position acquisition unit 20 can accurately specify the point-of-sight position V by specifying the driver's point-of-sight position V based on the information of the setting state of at least one of those vehicle devices.

Moreover, the point-of-sight position acquisition unit 20 specifies the driver's point-of-sight position V based on the body information concerning the driver's body. Accordingly, the point-of-sight position V can be accurately specified.

The point-of-sight position acquisition unit 20 includes the in-vehicle camera 23, which photographs the driver's face, and the image analysis section 24, which determines the positions of the driver's eyes from the image photograph by the in-vehicle camera 23 and acquires the driver's eye positions determined by the image analysis section 24 as the information of the point-of-sight position. Even when the driver changes his/her posture during driving, it is therefore possible to acquire the information of the point-of-sight position according to such a change.

The liquid crystal display 40 is provided for either the front pillar 104, instrument panel 105, or rear pillar 106. When the liquid crystal display 40 is provided for the front pillar 104, the liquid crystal display 40 can display an area which is out of the driver's line of sight at right or left turn of the vehicle. When the liquid crystal display 40 is provided for the instrument panel 105, the liquid crystal display 40 can display the left corner of the vehicle which is out of the driver's line of sight. When the liquid crystal display 40 is provided for the rear pillar 106, the liquid crystal display 40 can display a rear area which is out of the driver's line of sight when the driver checks a side of the vehicle at right or left turn or changes lanes.

Next, a description is given of a second embodiment of the present invention. The vehicle surroundings image providing system of the second embodiment is similar to that of the first embodiment but is partially different from that of the first embodiment in the configuration and contents of the processes. Hereinafter, a description is given of differences from the first embodiment.

Figure 15:
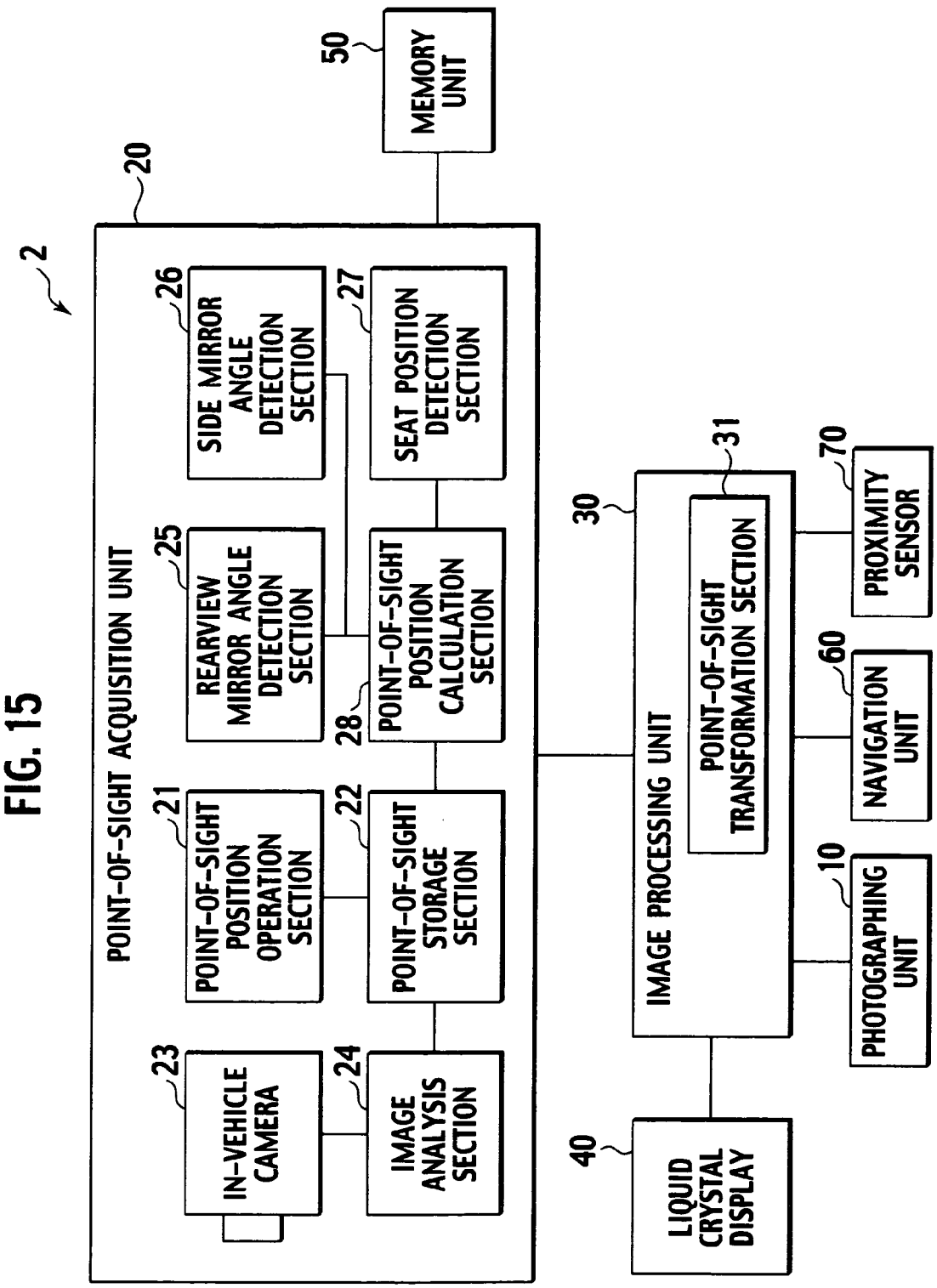
FIG. 15 is a block diagram of a vehicle surroundings image providing system of a second embodiment of the present invention.

FIG. 15 is a block diagram of a vehicle surroundings image providing system 2 of a second embodiment of the present invention. As shown in FIG. 15, a vehicle surroundings image providing system 2 of the second embodiment includes a navigation unit 60 and a proximity sensor 70. The navigation unit 60 calculates a route to a destination of a vehicle 100. The navigation unit 60 then acquires attribute information indicating a type (for example, an expressway, an open road, or a narrow road) of a road on which the vehicle runs. The proximity sensor 70 detects conditions around the vehicle. Specifically, the proximity sensor 70 detects an obstacle which is in an area out of the driver's line of sight.

Next, a description is given of the contents of a transformation process by the image processing unit 30 which is characteristic of the vehicle surroundings image providing system 2 of the second embodiment. The vehicle surroundings image providing system 2 of the second embodiment does not specify the point-of-sight position V in the form of a point but in the form of a space. The point-of-sight transformation section 31 of the second embodiment therefore specifies a space including a position at which the driver's point of sight is estimated to exist as a space area. The point-of-sight transformation section 31 performs coordinate transformation for the image photographed by the photographing unit 10 based on coordinates of a point (desirably, a plurality of points) within the space area and space coordinates of each pixel constituting the display screen of the liquid crystal display 40.

Figure 16:
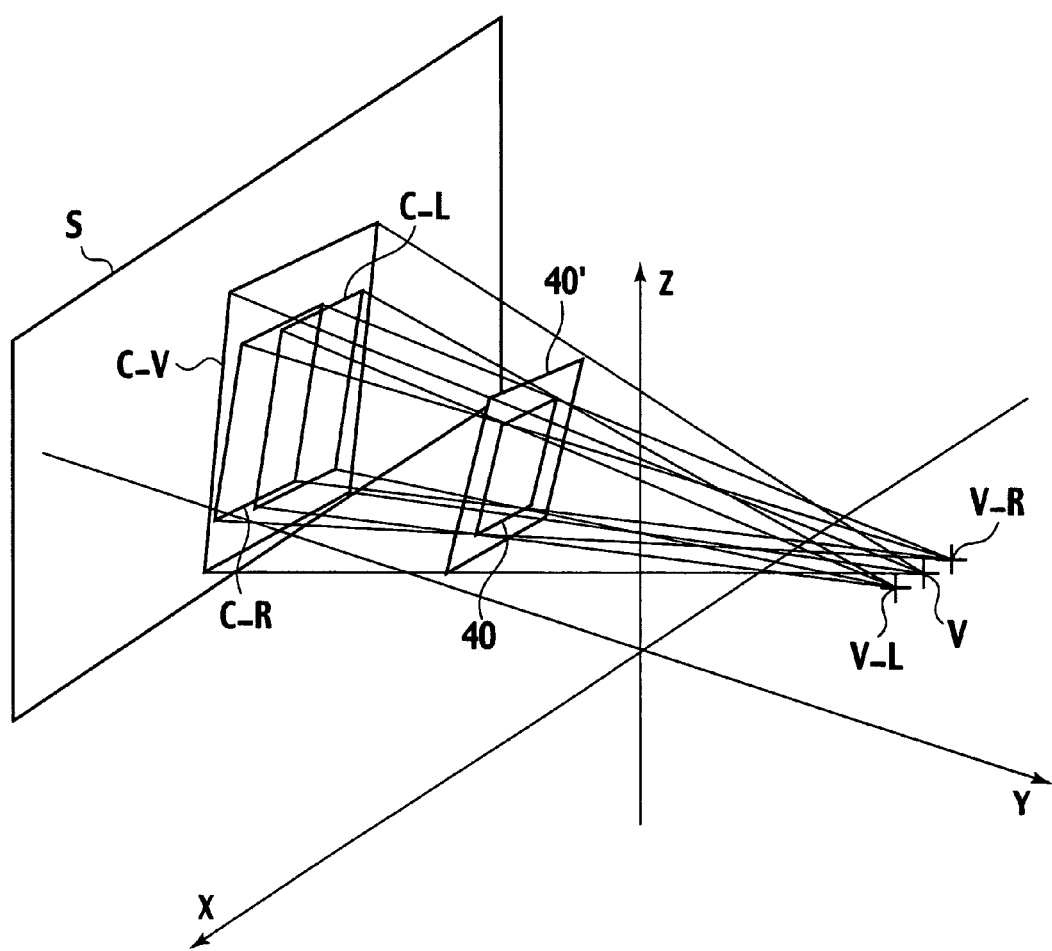
FIG. 16 is a first view showing contents of a transformation process by an image processing unit of the second embodiment.

FIG. 16 is a first view showing contents of a transformation process by an image processing unit 30 of the second embodiment. As shown in FIG. 16, the point-of-sight transformation section 31 specifies an area including the driver's right and left eyes as the space area. Hereinafter, details are described.

The point-of-sight transformation section 31 sets positions a predetermined distance apart from the point-of-sight position V in a right-left direction as right and left eye positions V_R and V_L of the driver. The right-left direction herein means a right-left direction when the driver directly faces the liquid crystal display 40. Specifically, the right-left direction is a direction which is vertical to a line connecting the point-of-sight position V and the center of the display screen of the liquid crystal display 40 and parallel to the ground. Moreover, the predetermined distance may be half of a distance between average human eyes. The predetermined distance is previously determined.

The point-of-sight transformation section 31 sets the space area including the driver's right and left eye positions V_R and V_L and calculates space coordinates V_R(x, y, z) of the right eye position V_R and space coordinates V_L(x, y, z) of the left eye position V_L of the driver which are located in the space area. Subsequently, the point-of-sight transformation section 31 calculates space coordinates L_p(x, y, z) of each pixel L_p constituting the display screen of the liquid crystal display 40.

The point-of-sight transformation section 31 sets the reference plane S at a predetermined position around the vehicle. The point-of-sight transformation section 31 then calculates a projection area of the display screen of the liquid crystal display 40 on the reference plane S. At this time, as described FIG. 16, the point-of-sight transformation section 31 calculates intersections L_c_R of the reference plane and half lines extending from the driver's right eye position V_R through each pixel L_p constituting the display screen of the liquid crystal display 40 and then sets an aggregate of these intersections L_c_R as a projection area C_R on the reference plane in the case of viewing from the driver's right eye. In a similar manner, the point-of-sight transformation section 31 calculates intersections L_c_L of the reference plane and half lines extending from the driver's left eye position V_L through the each pixel L_p constituting the display screen of the liquid crystal display 40 and then sets an aggregate of these intersections L_c_L as a projection area C_L on the reference plane in the case of viewing from the driver's left eye. Hereinafter, for ease of description, a combined area of these projection areas C_R and C_L is defined as a projection area C_RL.

Figure 17:
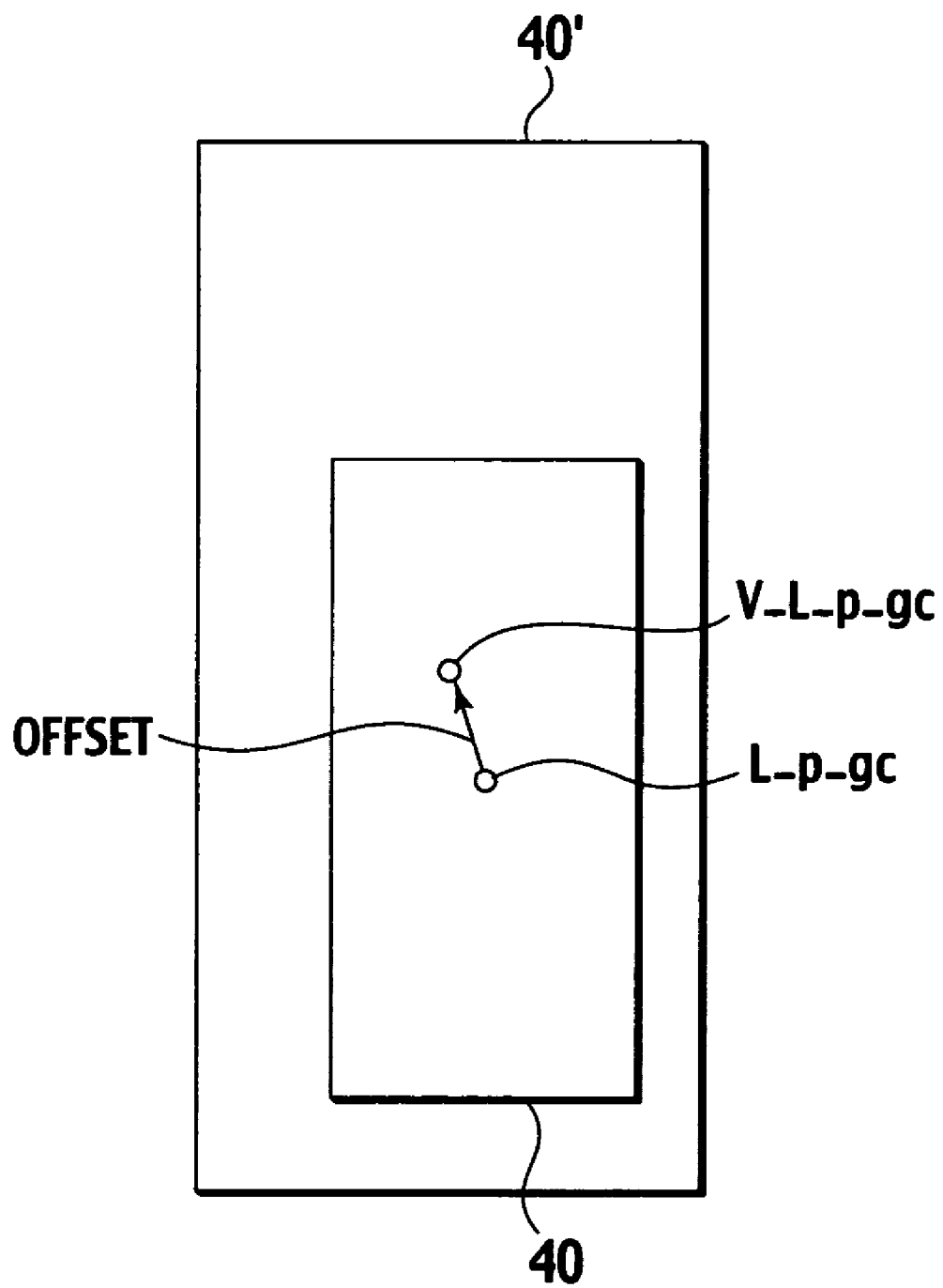
FIG. 17 is a view showing a relation between a virtual liquid crystal display and an actual liquid crystal display.

Next, the point-of-sight transformation section 31 defines a virtual liquid crystal display 40' on a basis of the liquid crystal display 40. To define the virtual liquid crystal display 40', first, the point-of-sight transformation section 31 calculates space coordinates V_L_p (x, y, z) of each pixel V_L_p of the virtual liquid crystal display 40'. The virtual liquid crystal display 40' includes the same number of pixels as that of the actual liquid crystal display 40 and has a physical size larger than that of the liquid crystal display 40. The space coordinates V_L_p (x, y, z) of each pixel V_L_p of the virtual liquid crystal display 40' are calculated as follows. As shown in FIG. 17, the point-of-sight transformation section 31 calculates a center-of-gravity pixel L_p_gc at the center of gravity among the pixels L_p constituting the display screen of the actual liquid crystal display 40. Herein, a vector from the center-of-gravity pixel L_p_gc to an arbitrary pixel L_p_n is defined as v_n. The point-of-sight transformation section 31 sets a predetermined offset offset (X, Y, Z) between the center-of-gravity pixel L_p_gc of the actual liquid crystal display 40 and a center-of-gravity pixel V_L_p_gc at the center of gravity of the virtual liquid crystal display 40'. The offset offset (X, Y, Z) may be (0, 0, 0). Space coordinates V_L_p_n(x_n, y_n, z_n) of an arbitrary pixel V_L_pn on the virtual liquid crystal display 40' are calculated by the following equation (1) using v n, offset(X, Y, Z), and vk which is larger than 1.0.

$$V\_L\_p\_n(x\_n, y\_n, z\_n) = L\_p\_n(x\_n, y\_n, z\_n) + \text{offset}(X, Y, Z) + v\_n \times vk \quad (1)$$

Next, intersections V_L_c of the reference plane and half lines extending from the driver's point-of-sight position V through each pixel V_L_p of the virtual liquid crystal display 40' are calculated, and an aggregate of the calculated intersections V_L_c is set as a virtual projection area C_V. Size of the virtual projection area C_V depends on the coefficient vk of the equation (1). The location of the virtual projection area C_V depends on the offset offset(X, Y, Z) in the equation (1).

In an example of FIG. 16, the coefficient vk and offset offset (X, Y, Z) are set so that the virtual projection area C_V includes the projection area C_RL. Note that the virtual projection area C_V does not necessarily include all of the projection area C_RL. For example, it may be configured to determine a standard so that the virtual projection area C_V includes 90% of the projection area C_RL or the like and set the coefficient vk and the value of the offset offset (X, Y, Z) which satisfy the above standard. As shown in FIG. 17, an aspect of the virtual liquid crystal display 40' is equal to an aspect of the actual liquid crystal display 40. However, it is possible to individually set coefficients for the x, y, and z components of the vector v_n of the equation (1) so that the aspect of the virtual liquid crystal display 40' is different from that of the liquid crystal display 40.

Next, similar to the first embodiment, the point-of-sight transformation section 31 creates an image to be displayed on the liquid crystal display 40 based on the space coordinates of the point-of-sight position V and the space coordinates of each pixel of the virtual projection area C_V. The image displayed on the liquid crystal display 40 includes a range shielded by the liquid crystal display 40 when the driver of the vehicle sees with his/her right eye and a range shielded by the liquid crystal display 40 when the driver of the vehicle sees with his/her left eye. The image displayed on the liquid crystal display 40 is an image continuous with an actual view seen through the front or side window to some extent independently of which of the driver's right and left eyes dominates the driver's vision. Accordingly, the driver of the vehicle can intuitively comprehend the contents of the displayed image.

The point-of-sight transformation section 31 of the second embodiment sets the coefficient vk to a value of not less than 1.0 and sets the virtual liquid crystal display 40' larger than the actual liquid crystal display 40. However, the point-of-sight transformation section 31 may set the coefficient vk to a value of less than 1.0. In this case, the virtual projection area C_V includes an overlapping area of the projection areas C_R and C_L. It may be configured to display a range which is not seen by either right or left eye on the liquid crystal display 40 by optimizing the coefficient vk and offset offset (X, Y, Z).

Figure 18:
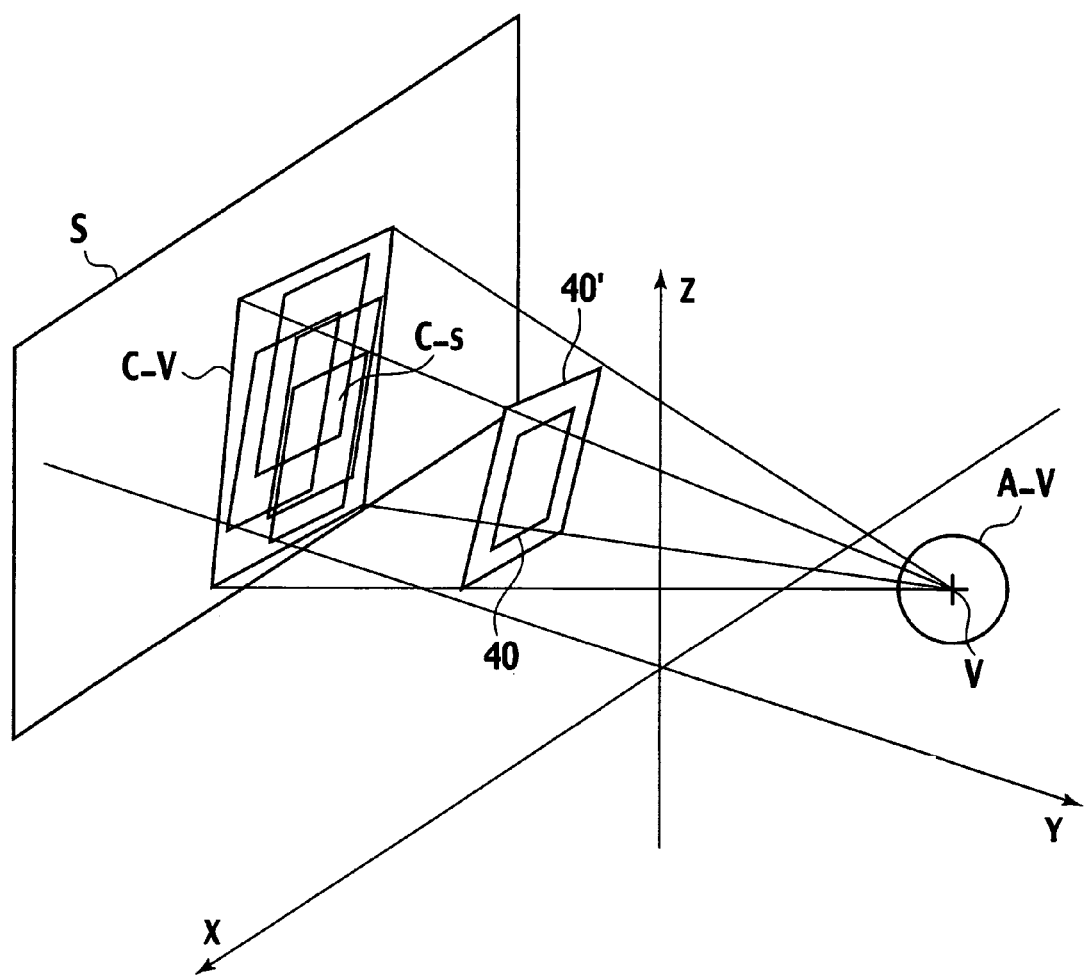
FIG. 18 is a second view showing contents of a transformation process by an image processing unit of the second embodiment.

FIG. 18 is a second view showing contents of a transformation process by an image processing unit 30 of the second embodiment. As shown in FIG. 18, the point-of-sight transformation section 31 may specify a range where the driver's point-of-sight position V moves according to movement of the driver's head. Hereinafter, a concrete description is given.

First, after the viewing point acquisition unit 20 calculates the driver's point-of-sight position V, the point-of-sight transformation section 31 specifies a space area A_V in a predetermined range around the point-of-sight position V as shown in FIG. 18. Subsequently, the point-of-sight transformation section 31 calculates space coordinates P1(x, y, z), P2(x, y, z), . . . , Pn(x, y, z) of a plurality of points P1, P2, . . . , Pn located within the space area A_V. Herein, the space area A_V has a range where the viewing point moves as the driver's head moves during driving and previously determined. Specifically, the space area A_V may be set in a range where an average human neck moves.

The movement of the driver's head during driving greatly changes depending on what kind of road the vehicle is running on. When the vehicle is running on an expressway, the movement of the driver's head is comparatively small. However, when the vehicle is running on a city street, the movement of the driver's head is larger than that when the vehicle is running on the expressway. The point-of-sight transformation section 31 may receive the attribute information of the road where the vehicle is running from the navigation unit 60 and set the size of the space area A_V according to the attribute information. The point-of-sight transformation section 31 is not limited to receiving the attribute information of the road from the navigation unit 60 but may estimate the attribute information of the road where the vehicle is currently running, for example, based on running speed of the vehicle.

Subsequently, the point-of-sight transformation section 31 calculates space coordinates L_p(x, y, z) of each pixel L_p constituting the display screen of the liquid crystal display 40. The point-of-sight transformation section 31 then sets a reference plane S at a predetermined position around the vehicle. The point-of-sight transformation section 31 calculates a projection area of the display screen of the liquid crystal display 40 on the reference plane.

At this time, in the example of FIG. 17, the point-of-sight transformation section 31 calculates projection areas on the reference plane when the plurality of points P1, P2, . . . , Pn located within the space area A_V are set as the starting point. Subsequently, the point-of-sight transformation section 31 sets a combined area of the plurality of projection areas on the reference plane corresponding to the plurality of points P1, P2, . . . , Pn as a projection area C_s. At this time, to accurately calculate the projection area C_s, the point-of-sight transformation section 31 plots many points in the space area A_V and calculates a number of projection areas corresponding to these many points. Calculation of the projection areas corresponding to the many points requires much computational effort. Accordingly, the point-of-sight transformation section 31 may calculate the projection areas for a fewer representative points within the space area A_V to reduce the computational effort.

Next, the point-of-sight transformation section 31 defines the virtual liquid crystal display 40' on a basis of the liquid crystal display 40. The point-of-sight transformation section 31 calculates the space coordinates V_L_p (x, y, z) of each pixel V_L_p of the virtual liquid crystal display 40'. The point-of-sight transformation section 31 then calculates intersections V_L_c of the reference plane and the half lines extending from the driver's point-of-sight position V through the pixels of the virtual liquid crystal display 40'. Next, the point-of-sight transformation section 31 then sets an aggregate of these intersections V_L_c as the virtual projection area C_V. At this time, the coefficient vk and offset offset (X, Y, Z) are optimized so that the virtual projection area C_V includes the projection area C_s.

Note that the virtual projection area C_V does not necessarily include all of the projection area C_s. For example, it may be configured to determine a standard so that the virtual projection area C_V includes 90% of the projection area C_s or the like and set the coefficient vk and offset offset (X, Y, Z) which satisfy the above standard. As shown in FIG. 17, the aspect of the virtual liquid crystal display 40' is equal to the aspect of the actual liquid crystal display 40. However, it is possible to individually set coefficients for the x, y, and z components of the vector v_n of the equation (1) so that the aspect of the virtual liquid crystal display 40' is different from that of the liquid crystal display 40.

Next, similar to the first embodiment, the point-of-sight transformation section 31 creates an image to be displayed on the liquid crystal display 40 based on the space coordinates of the point-of-sight position V and the space coordinates of each pixel of the virtual projection area C_V. The image displayed on the liquid crystal display 40 therefore includes a range shielded by the liquid crystal display 40 when seen from the point of sight within the range where the driver moves his/her head during driving. The image displayed on the liquid crystal display 40 is therefore continuous to some extent with an actual view seen through the front or side window even if the driver's point-of-sight position V is shifted by the movement of the head. Accordingly, the driver of the vehicle can intuitively comprehend the contents of the displayed image.

The point-of-sight transformation section 31 of the second embodiment sets the coefficient vk to a value of not less than 1.0 and sets the virtual liquid crystal display 40' larger than the actual liquid crystal display 40. However, the point-of-sight transformation section 31 may set the coefficient vk to a value of less than 1.0. In this case, the virtual projection area C_V includes an overlapping area of the projection areas C_s, and it may be configured to display a range which is not seen from anywhere onto the liquid crystal display 40 by adjusting the coefficient vk and offset offset (X, Y, Z).

Figure 19:
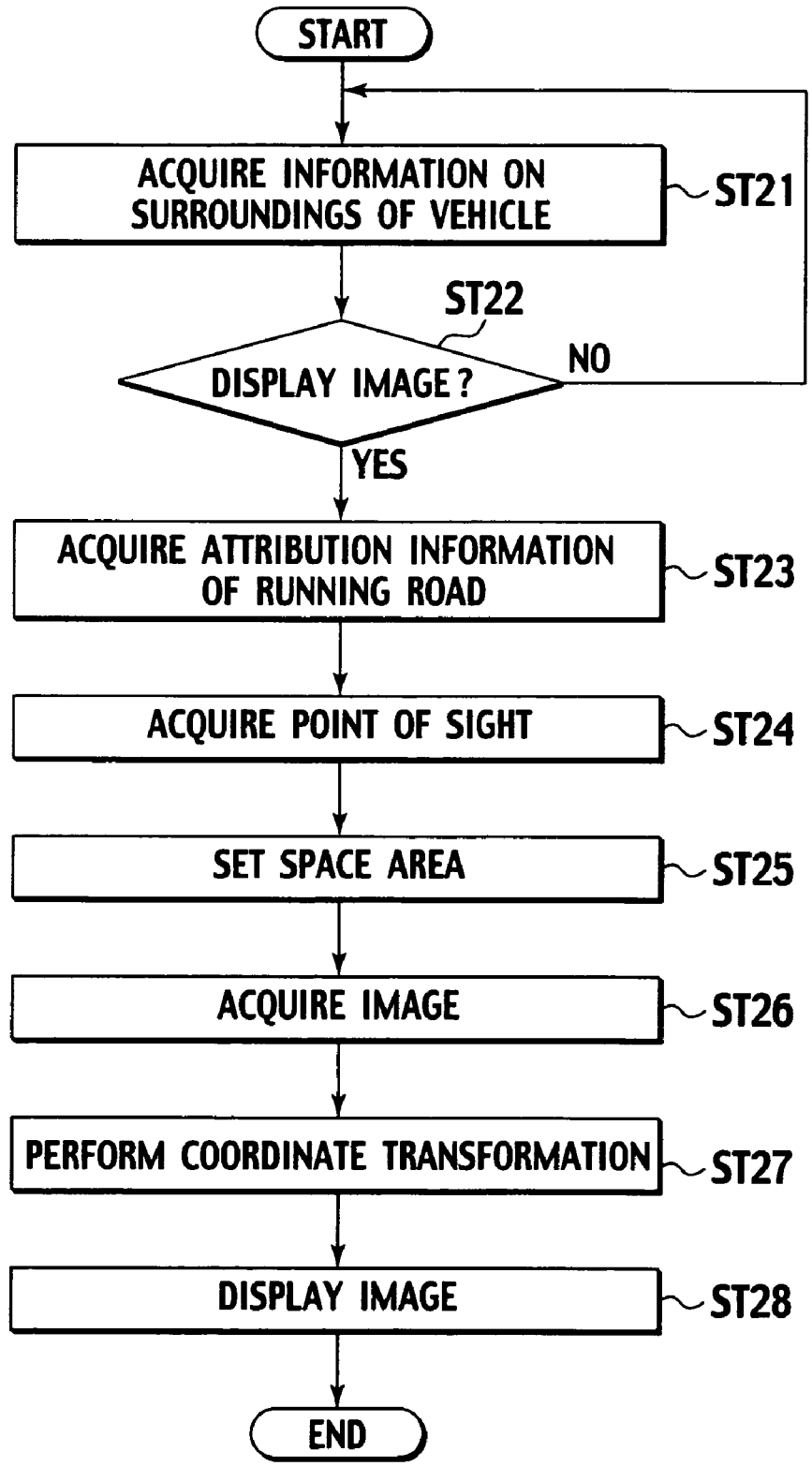
FIG. 19 is a flowchart showing an example of a detailed operation of the vehicle surroundings image providing system of the second embodiment.

Next, a description is given of an example of a detailed operation of the vehicle surroundings image providing system 2 according to the embodiment in detail. FIG. 19 is a flowchart showing an example of a detailed operation of the vehicle surroundings image providing system 2 of the second embodiment. As shown in FIG. 19, first, the proximity sensor 70 detects an obstacle existing in an area which is out of the driver's line of sight (ST21). Next, the image processing unit 30 determines whether to display the image photographed by the photographing unit 10 onto the liquid crystal display 40 (ST22).

Herein, when there is an obstacle in an area which is out of the driver's line of sight, the image processing unit 30 determines to display the image photographed by the photographing unit 10 onto the liquid crystal display 40 (ST22: YES). The process proceeds to step ST23. On the other hand, when there is no obstacle in the area which is out of the driver's line of sight, the image processing unit 30 determines not to display the image photographed by the photographing unit 10 onto the liquid crystal display 40 (ST22: NO). The process then proceeds to the step ST21.

In the step S22, the image processing unit 30 determines whether to display the image based on whether an obstacle exists in the area which is out of the driver's line of sight. However, the image processing unit 30 is not limited to this and only needs to determine whether to display the image according to the condition around the vehicle.

In the step ST23, the navigation unit 60 acquires the attribution information of the road where the vehicle is running. Subsequently, the point-of-sight position acquisition unit 20 acquires the information of the driver's point-of-sight position (ST24). Thereafter, the point-of-sight transformation section 31 sets the size of the space area based on the attribute information as shown in FIG. 18 (ST25).

Next, the photographing unit 10 acquires an image of an area around the vehicle which is out of the driver's line of view (ST26). Subsequently, the point-of-sight transformation section 31 performs the coordinate transformation process as described with reference to FIG. 18 (ST27). The liquid crystal display 40 displays the image processed in the step ST27. Thereafter, the aforementioned processes are repeated until the system 2 is powered off.

The vehicle surroundings image providing system 2 and method of the second embodiment can therefore reduce the driver's uncomfortable feeling when providing the driver with an image of an area around the vehicle which is out of the driver's line of view. Moreover, even if the driver's point-of-sight position V has changed, the image of the liquid crystal display 40 is adjusted to be displayed as if the outside of the vehicle was directly seen through the liquid crystal display 40.

Moreover, the point-of-sight position is determined by an operation of the driver. Accordingly, the point-of-sight position V can be accurately set. Moreover, the point-of-sight position V can be specified without the need for input by the driver. Furthermore, specifying the driver's point-of-sight position V based on the information of the setting states of the vehicle devices allows the point-of-sight position V to be accurately specified even if the driver is changed to another person. The point-of-sight position V can be also accurately specified by specifying the driver's point-of-sight position V based on the body information concerning the driver's body. The point-of-sight transformation section 31 acquires the eye positions determined by the image analysis section 24 as the information of the point-of-sight position V. Accordingly, even when the driver changes his/her posture during driving, it is possible to acquire information of the point-of-sight position V according to such a change.

When the liquid crystal display 40 is provided for the front pillar 104, the liquid crystal display 40 can display an area which is out of the driver's line of sight at right or left turn of the vehicle. When the liquid crystal display 40 is provided for the instrument panel 105, the liquid crystal display 40 can display the left corner of the vehicle which is out of the driver's line of sight. When the liquid crystal display 40 is provided for the rear pillar 106, the liquid crystal display 40 can display a rear area which is out of the driver's line of sight when the driver checks a side of the vehicle at right or left turn or changes lanes.

Furthermore, in the vehicle surroundings image providing system 2 and method of the second embodiment, the point-of-sight transformation section 31 specifies an area including the driver's right and left eyes as the space area. The point-of-sight transformation section 31 performs the coordinate transformation for the image based on the space coordinates of the plurality of points in the space area and the space coordinates of the pixels constituting the display screen of the liquid crystal display 40. The image displayed on the liquid crystal display 40 is therefore continuous to some extent with an actual view seen through the front or side window independently of which of the driver's right and left eyes dominates the driver's vision. Accordingly, the driver of the vehicle can intuitively comprehend the contents of the displayed image.

The point-of-sight transformation section 31 specifies a range where the driver's point-of-sight position moves according to movement of the driver's head. The point-of-sight transformation section 31 performs the coordinate transformation for the image based on the space coordinates of the plurality of points within the space area and the space coordinates of the pixels constituting the display screen of the liquid crystal display 40. The image displayed on the liquid crystal display 40 is therefore continuous to some extent with an actual view seen through the front or side window even if the driver's point-of-sight position V is shifted by the movement of the head. Accordingly, the driver of the vehicle can intuitively comprehend the contents of the displayed image.

The navigation unit 60 acquires the attribute information of the road on which the vehicle is running. The point-of-sight transformation section 31 sets the size of the space area based on the attribute information acquired by the navigation unit 60. The movement of the driver's head during driving greatly changes depending on what type of road the vehicle is running on. When the vehicle is running on an expressway, the movement of the driver's head is comparatively small. However, when the vehicle is running on a city street, the movement of the driver's head is larger than that when the vehicle is running on the expressway. Accordingly, the point-of-sight transformation section 31 setting the size of the space area according to the attribute information can provide a proper size of the space area.

Moreover, the image processing unit 30 switches according to the condition around the vehicle between displaying and not displaying the image. The image processing unit 30 is therefore allowed to display the image of a blind spot only when being required to display the blind spot. Accordingly, the liquid crystal display 40 does not display an image when it is not necessary to display the image. This can reduce power consumption.

Hereinabove, the present invention is described based on the embodiments. However, the present invention is not limited to the aforementioned embodiments and may be modified without departing from the scope of the present invention. Moreover, the embodiments may be combined.

The entire content of Japanese Patent Application No. P2005-282073 with a filing date of Sep. 28, 2005 and P2005-294635 with a filing date of Oct. 7, 2005 are herein incorporated by reference.

What is claimed is:

1. A vehicle surroundings image providing system which provides a driver with an image obtained by photographing an area around a vehicle, the system comprising:
   a photographing unit which photographs an area around the vehicle which includes a first region corresponding to a blind spot created by a component of the vehicle;
   an image processing unit which processes an image of the area around the vehicle photographed by the photographing unit; and
   a display unit which displays the image processed by the image processing unit, and is provided on the component of the vehicle creating the blind spot,
   wherein the image processing unit performs coordinate transformation for the image photographed by the photographing unit based on first information of space coordinates corresponding to a point-of-sight position of the driver in a coordinate system fixed to the vehicle and second information of space coordinates of each pixel constituting a display screen of the display unit in the coordinate system fixed to the vehicle, and
   the image displayed by the display unit corresponds to a view of the first region as would be seen directly from the point-of-sight position of the driver, if the display unit and the component of the vehicle were transparent.

2. The vehicle surroundings image providing system according to claim 1, wherein the image processing unit specifies the first information in a form of a point.

3. The vehicle surroundings image providing system according to claim 1,
   wherein the image processing unit specifies a certain space area for the coordinate transformation,
   the certain space area is specified to include a position where a point of sight of the driver is estimated to exist, and
   the image processing unit performs the coordinate transformation for the image photographed by the photographing unit based on a space coordinate corresponding to a point within the certain space area and the second information.

4. The vehicle surroundings image providing system according to claim 3, wherein the image processing unit performs coordinate transformation for the image photographed by the photographing unit based on space coordinates corresponding to a plurality of points within the certain space area and the second information.

5. The vehicle surroundings image providing system according to claim 3, wherein the certain space area is specified to include positions where right and left eyes of the driver are estimated to exist by the image processing unit.

6. The vehicle surroundings image providing system according to claim 3, wherein the certain space area is specified to include a range where the point-of-sight position of the driver moves according to movement of the driver's head.

7. The vehicle surroundings image providing system according to claim 1, further comprising:
   a point-of-sight position acquisition unit which acquires the first information of the point-of-sight position of the driver,
   wherein the image processing unit performs coordinate transformation for the image photographed by the photographing unit based on the first information of the point-of-sight position acquired by the point-of-sight position acquisition unit and the second information.

8. The vehicle surroundings image providing system according to claim 7, wherein the point-of-sight position acquisition unit includes an operation section which allows the driver to directly input and specifies the first information based on information inputted through the operation section.

9. The vehicle surroundings image providing system according to claim 7,
   wherein the point-of-sight position acquisition unit includes:
   a device detection section which is configured to detect a setting state of a vehicle device used by the driver; and
   a point-of-sight position specifying section which analyzes third information of the setting state of the vehicle device detected by the device detection section to specify the point-of-sight position.

10. The vehicle surroundings image providing system according to claim 9,
    wherein the device detection section specifies the point-of-sight position of the driver based on the third information detected by at least one of:
    a rearview mirror angle detection section which detects an angle of a mirror surface of a rearview mirror;
    a side mirror angle detection section which detects an angle of a mirror surface of a side mirror; and
    a seat position detection section which detects a longitudinal position of a seat cushion and an angle of a seatback of a driver's seat.

11. The vehicle surroundings image providing system according to claim 7, wherein the point-of-sight position acquisition unit specifies the point-of-sight position of the driver based on body information concerning the driver's body.

12. The vehicle surroundings image providing system according to claim 1,
    wherein the point-of-sight position acquisition unit includes:
    an in-vehicle photographing unit which photographs the driver's face; and
    an eye position determination unit which determines eye positions of the driver from the image photographed by the in-vehicle photographing unit, and
    the point-of-sight position acquisition unit acquires the eye positions determined by the eye position determination unit as the first information of the point-of-sight position.

13. The vehicle surroundings image providing system according to claim 1, wherein the display unit is provided for any one of a front pillar which supports a roof of the vehicle on a vehicle front side, an instrument panel between a driver's seat and a front passenger seat, and a rear pillar which supports the roof of the vehicle on a vehicle rear side.

14. The vehicle surroundings image providing system according to claim 2, further comprising an attribute information acquisition unit which acquires attribution information indicating a type of a road on which the vehicle runs, wherein the image processing unit changes size of the space area based on the attribution information of the road acquired by the attribute information acquisition unit.

15. The vehicle surroundings image providing system according to claim 1, further comprising a surrounding condition detection unit which detects a condition around the vehicle, wherein the image processing unit switches between displaying and not displaying the image according to a result of detection by the surrounding condition detection unit.

16. The vehicle surroundings image providing system according to claim 1, wherein the image processing unit sets a reference plane at a predetermined position within the area;

calculates an intersection of the reference plane and a half line extending from the point-of-sight position through a specific pixel constituting a display screen of the display unit;

sets data for the specific pixel using data of a pixel at the intersection; and performs a series of the above processes for every pixel constituting the display screen of the display unit to create an image to be displayed on the display unit.

17. A method for providing a driver with a vehicle surroundings image obtained by photographing an area around the vehicle, the method comprising the steps of:

photographing an area around the vehicle which includes a first region corresponding to a blind spot created by a component of the vehicle;

performing coordinate transformation for the photographed image based on first information of space coordinates corresponding to a point-of-sight position of the driver in a coordinate system fixed to the vehicle and second information of space coordinates of each pixel constituting a display screen of a display unit in the coordinate system fixed to the vehicle; and displaying the coordinate-transformed image on the display unit which is provided on the component of the vehicle creating the blind spot, wherein the coordinate-transformed image corresponds to a view of the first region as would be seen directly from the point-of-sight position of the driver, if the display unit and the component of the vehicle were transparent.

18. A vehicle surroundings image providing system which provides a driver with an image obtained by photographing an area around a vehicle, the system comprising:

a photographing means for photographing an area around the vehicle which includes a first region corresponding to a blind spot created by a component of the vehicle;

an image processing means for processing an image of the area around the vehicle photographed by the photographing means; and a display means for displaying the image processed by the image processing means being provided on the component of the vehicle creating the blind spot, wherein the image processing means performs coordinate transformation for the image photographed by the photographing means based on first information of space coordinates corresponding to a point-of-sight position of the driver in a coordinate system fixed to the vehicle and second information of space coordinates of each pixel constituting a display screen of the display means in the coordinate system fixed to the vehicle, and the image displayed by the display means corresponds to a view of the first region as would be seen directly from the point-of-sight position of the driver, if the display means and the component of the vehicle were transparent.

* * * * *